US012022509B2

(12) United States Patent
Liu et al.

(10) Patent No.: US 12,022,509 B2
(45) Date of Patent: Jun. 25, 2024

(54) CHANNEL OCCUPANCY TIME RESOURCE RESERVATION AND SELECTION FOR NEW RADIO SIDELINK COMMUNICATIONS

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 17/455,391

(22) Filed: Nov. 17, 2021

(65) Prior Publication Data
US 2023/0156784 A1    May 18, 2023

(51) Int. Cl.
*H04W 74/0808* (2024.01)
*H04B 17/318* (2015.01)
*H04W 16/14* (2009.01)
*H04W 72/044* (2023.01)
*H04W 72/20* (2023.01)

(52) U.S. Cl.
CPC ...... *H04W 74/0808* (2013.01); *H04B 17/318* (2015.01); *H04W 16/14* (2013.01); *H04W 72/044* (2013.01); *H04W 72/20* (2023.01)

(58) Field of Classification Search
CPC . H04W 74/0808; H04W 72/20; H04W 16/14; H04W 72/044; H04B 17/318
See application file for complete search history.

(56) References Cited

U.S. PATENT DOCUMENTS

| 2019/0268912 A1* | 8/2019 | Myung | H04W 72/23 |
| 2020/0304159 A1* | 9/2020 | Liao | H04J 11/0036 |
| 2022/0070851 A1* | 3/2022 | Zhang | H04L 1/0046 |
| 2022/0150927 A1* | 5/2022 | Shin | H04L 5/0092 |
| 2023/0138096 A1* | 5/2023 | Zhao | H04W 74/0866 370/329 |

* cited by examiner

*Primary Examiner* — Kevin M Cunningham
(74) *Attorney, Agent, or Firm* — QUALCOMM Incorporated

(57) ABSTRACT

Wireless communications systems and methods related to communicating control information are provided. A method of wireless communication performed by a first sidelink user equipment (UE) may include receiving, from a base station (BS), a resource pool (RP) configuration that indicates resources in a licensed frequency band reserved for sidelink control information (SCI), transmitting, to a second sidelink UE, the SCI in the reserved resources, wherein the SCI includes a starting position of channel occupancy time (COT) resources in an unlicensed frequency band, and transmitting, to the second sidelink UE, a physical sidelink shared channel (PSSCH) via the COT resources in the unlicensed frequency band.

28 Claims, 9 Drawing Sheets

CHANNEL OCCUPANCY TIME RESOURCE RESERVATION AND SELECTION FOR NEW RADIO SIDELINK COMMUNICATIONS

TECHNICAL FIELD

This application relates to wireless communication systems, and more particularly, to reserving and selecting resources for channel occupancy time in new radio sidelink communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a first sidelink user equipment (UE) may include receiving, from a base station (BS), a resource pool (RP) configuration that indicates resources in a licensed frequency band reserved for sidelink control information (SCI); transmitting, to a second sidelink UE, the SCI in the reserved resources, wherein the SCI includes a starting position of channel occupancy time (COT) resources in an unlicensed frequency band; and transmitting, to the second sidelink UE, a physical sidelink shared channel (PSSCH) via the COT resources in the unlicensed frequency band.

In an additional aspect of the disclosure, a method of wireless communication performed by a first sidelink user equipment (UE) may include receiving, from a base station (BS), a resource pool (RP) configuration that indicates resources in a licensed frequency band reserved for sidelink control information (SCI); receiving, from a second sidelink UE, the SCI in the reserved resources, wherein the SCI includes a starting position of channel occupancy time (COT) resources in an unlicensed frequency band; and receiving, from the second sidelink UE, a physical sidelink shared channel (PSSCH) via the COT resources in the unlicensed frequency band.

In an additional aspect of the disclosure, a first sidelink user equipment (UE) may include a memory; a transceiver; and at least one processor coupled to the memory and the transceiver, wherein the first sidelink UE is configured to receive, from a base station (BS), a resource pool (RP) configuration that indicates resources in a licensed frequency band reserved for sidelink control information (SCI); transmit, to a second sidelink UE, the SCI in the reserved resources, wherein the SCI includes a starting position of channel occupancy time (COT) resources in an unlicensed frequency band; and transmit, to the second sidelink UE, a physical sidelink shared channel (PSSCH) via the COT resources in the unlicensed frequency band.

In an additional aspect of the disclosure, first sidelink user equipment (UE) may include a memory; a transceiver; and at least one processor coupled to the memory and the transceiver, wherein the first sidelink UE is configured to receive, from a base station (BS), a resource pool (RP) configuration that indicates resources in a licensed frequency band reserved for sidelink control information (SCI); receive, from a second sidelink UE, the SCI in the reserved resources, wherein the SCI includes a starting position of channel occupancy time (COT) resources in an unlicensed frequency band; and receive, from the second sidelink UE, a physical sidelink shared channel (PSSCH) via the COT resources in the unlicensed frequency band.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
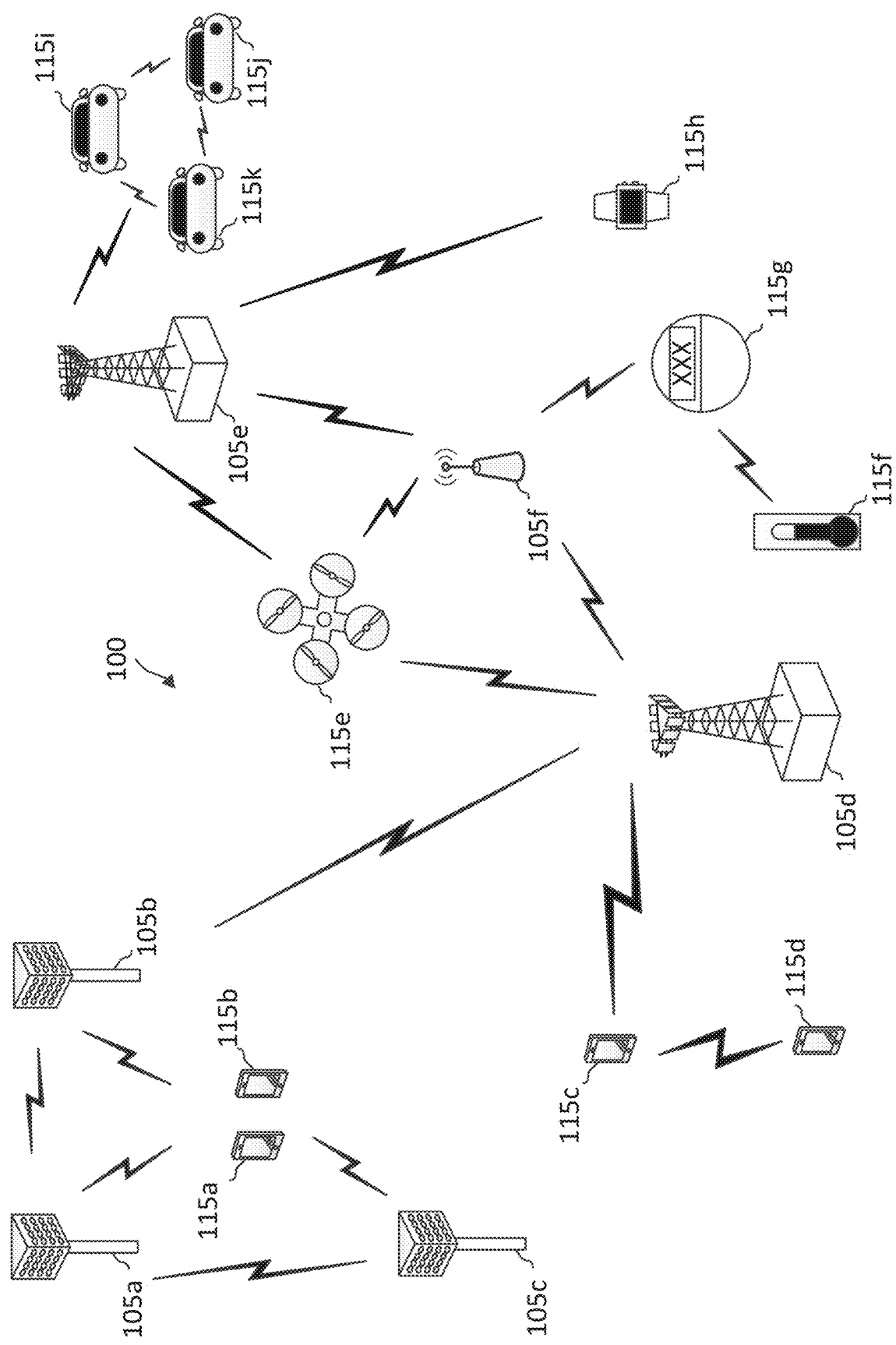
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, UE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Aspects of the present disclosure may provide several benefits. A UE may receive an indicator indicating an SCI resource pool in a licensed frequency band. The UE may transmit the SCI to another UE. The SCI may include a configuration for COT resources in an unlicensed frequency band. The UE may begin to transmit a communication (e.g., a transport block (TB)) to another UE after the UE performs a listen-before-talk (LBT) procedure that passes in the unlicensed frequency band. In this manner, the BS may increase the frequency re-use and/or spatial diversity of the network in a shared frequency band and increase the overall performance of the network.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by LTEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The LTEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, the UEs 115c and UE 115d may be sidelink UEs. The UE 115c may receive a resource pool (RP) configuration from the BS 105 that indicates resources in a licensed frequency band reserved for sidelink control information (SCI). The UE 115c may transmit the SCI in the reserved resources to the UE 115d. In some aspects, the SCI may include a starting position of channel occupancy time (COT) resources in an unlicensed frequency band. The UE 115c may transmit a physical sidelink shared channel (PSSCH) to the UE 115d via the COT resources in the unlicensed frequency band.

Figure 2:
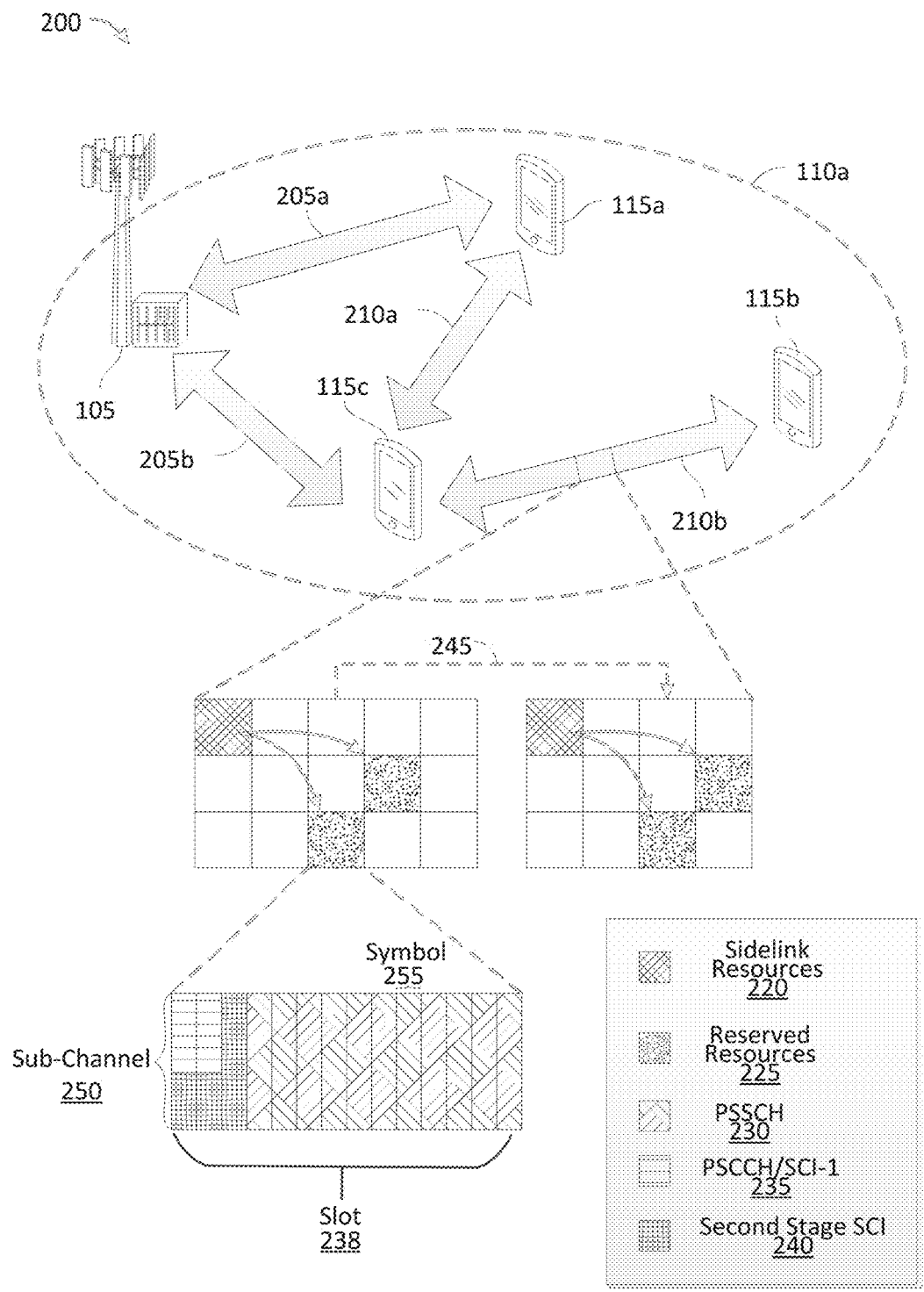
FIG. 2 illustrates a sidelink wireless communication network according to some aspects of the present disclosure.

FIG. 2 illustrates sidelink resources associated with a wireless communication network 200 according to some aspects of the present disclosure. The wireless communications network 200 may include a base station 105a and UEs 115a, 115b, and 115c, which may be examples of a BS 105 and a UE 115 as described with reference to FIG. 1. Base station 105a and UEs 115a and 115c may communicate within geographic coverage area 110a and via communication links 205a and 205b, respectively. UE 115c may communicate with UEs 115a and 115b via sidelink communication links 210a and 210b, respectively. In some examples, UE 115c may transmit SCI to UEs 115a and 115b via the sidelink control resources 220. The SCI may include an indication of resources reserved for retransmissions by UE 115c (e.g., the reserved resources 225). In some examples, UEs 115a and 115b may determine to reuse one or more of the reserved resources 225.

In some aspects, a device in the wireless communication network 200 (e.g., a UE 115, a BS 105, or some other node) may convey SCI to another device (e.g., another UE 115, a BS 105, sidelink device or vehicle-to-everything (V2X) device, or other node). The SCI may be conveyed in one or more stages. The first stage SCI may be carried on the PSCCH while the second stage SCI may be carried on the corresponding PSSCH. For example, UE 115c may transmit a PSCCH/first stage SCI 235 (e.g., SCI-1) to each sidelink UE 115 in the network (e.g., UEs 115a and 115b) via the sidelink communication links 210. The PSCCH/first stage SCI-1 235 may indicate resources that are reserved by UE 115c for retransmissions (e.g., the SCI-1 may indicate the reserved resources 225 for retransmissions). Each sidelink UE 115 may decode the first stage SCI-1 to determine where the reserved resources 225 are located (e.g., to refrain from using resources that are reserved for another sidelink transmission and/or to reduce resource collision within the wireless communications network 200). Sidelink communication may include a mode 1 operation in which the UEs 115 are in a coverage area of BS 105a. In mode 1, the LTEs 115 may receive a configured grant from the BS 105a that defines parameters for the LTEs 115 to access the channel. Sidelink communication may also include a mode 2 operation in which the UEs 115 operate autonomously from the BS 105a and perform sensing of the channel to gain access to the channel. In some aspects, during mode 2 sidelink operations, the sidelink UEs 115 may perform channel sensing to locate resources reserved by other sidelink transmissions. The first stage SCI-1 may reduce the need for sensing each channel. For example, the first stage SCI-1 may include an explicit indication such that the UEs 115 may refrain from blindly decoding each channel. The first stage SCI-1 may be transmitted via the sidelink control resources 220. The sidelink control resources 220 may be configured resources (e.g., time resources or frequency resources) transmitted via a PSCCH 235. In some examples, the PSCCH 235 may be configured to occupy a number of physical resource blocks (PRBs) within a selected frequency. The frequency may include a single subchannel 250 (e.g., 10, 12, 15, 20, 25, or some other number of RBs within the subchannel 250). The time duration of the PSCCH 235 may be configured by the BS 105a (e.g., the PSCCH 235 may span 1, 2, 3, or some other number of symbols 255).

The first stage SCI-1 may include one or more fields to indicate a location of the reserved resources 225. For example, the first stage SCI-1 may include, without limitation, one or more fields to convey a frequency domain resource allocation (FDRA), a time domain resource allocation (TDRA), a resource reservation period 245 (e.g., a period for repeating the SCI transmission and the corresponding reserved resources 225), a modulation and coding scheme (MCS) for a second stage SCI-2 240, a beta offset value for the second stage SCI-2 240, a DMRS port (e.g., one bit indicating a number of data layers), a physical sidelink feedback channel (PSFCH) overhead indicator, a priority, one or more additional reserved bits, or a combination thereof. The beta offset may indicate the coding rate for transmitting the second stage SCI-2 240. The beta offset may indicate an offset to the MCS index. The MCS may be indicated by an index ranging from 0 to 31. For example, if the MCS is set at index 16 indicating a modulation order of 4 and a coding rate of 378, the beta offset may indicate a value of 2 thereby setting the coding rate to 490 based on an MCS index of 18. In some examples, the FDRA may be a number of bits in the first stage SCI-1 that may indicate a number of slots 238 and a number of subchannels reserved for the reserved resources 225 (e.g., a receiving UE 115 may determine a location of the reserved resources 225 based on the FDRA by using the subchannel 250 including the PSCCH 235 and first stage SCI-1 as a reference). The TDRA may be a number of bits in the first stage SCI-1 (e.g., 5 bits, 9 bits, or some other number of bits) that may indicate a number of time resources reserved for the reserved resources 225. In this regard, the first stage SCI-1 may indicate the reserved resources 225 to the one or more sidelink UEs 115 in the wireless communication network 200.

In some aspects, the UEs 115a and UE 115c may be sidelink UEs. The UE 115a may receive a resource pool (RP) configuration from the BS 105 that indicates resources in a licensed frequency band reserved for sidelink control information (SCI). The LTE 115a may transmit the SCI in the reserved resources to the UE 115c. In some aspects, the SCI may include a starting position of channel occupancy time (COT) resources in an unlicensed frequency band. The UE 115a may transmit a physical sidelink shared channel (PSSCH) to the UE 115c via the COT resources in the unlicensed frequency band. In this manner, the UE may increase the frequency re-use and/or spatial diversity of the network in a shared frequency band and increase the overall performance of the network through the use of an RP configuration for SCI transmission in the licensed frequency band and COT starting positions in the unlicensed frequency band.

Figure 3:
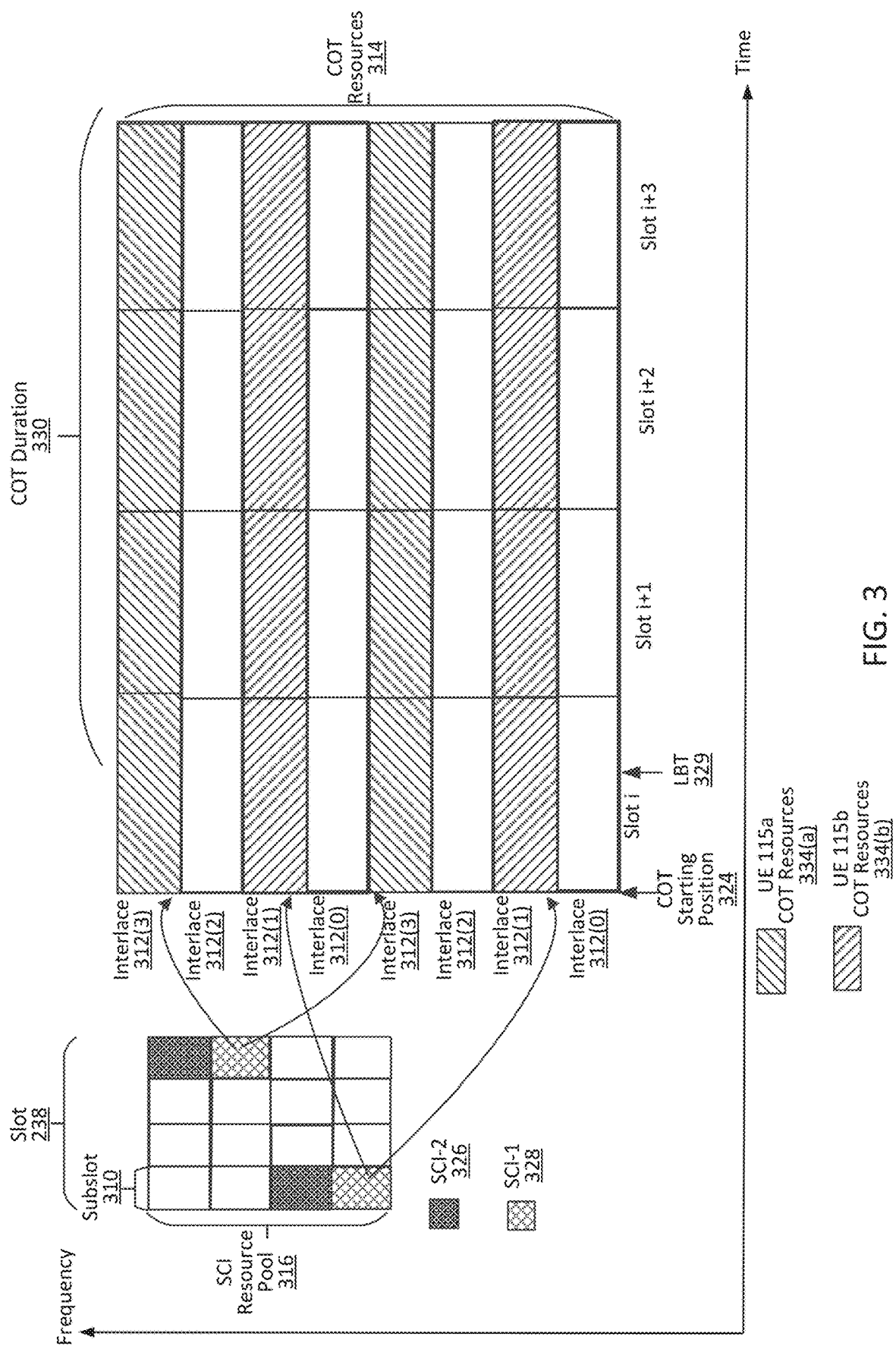
FIG. 3 illustrates time and frequency domain resources associated with a channel occupancy time (COT) according to some aspects of the present disclosure.

FIG. 3 illustrates time and frequency domain resources associated with a channel occupancy time (COT) according to some aspects of the present disclosure. In FIG. 3, the x-axis represents time in some arbitrary units and the y-axis represents frequency in some arbitrary units.

In some aspects a UE (e.g., the UE 115 or the UE 600) may receive a resource pool (RP) configuration from a base station (BS) for a sidelink control information (SCI) resource pool (RP) 316 that indicates resources in a licensed frequency band reserved for the SCI. In some aspects, the UE may operate in sidelink mode 1 in which the UE is in communication with the BS in order to receive the RP configuration from the BS. In this regard, the UE may receive the RP configuration in a physical downlink control channel (PDCCH), a physical broadcast channel (PBCH), a physical downlink shared channel (PDSCH), or other suitable channel. In some aspects, the UE may receive the RP configuration in downlink control information (e.g., a DCI3_x or other DCI communication format). The UE may be a sidelink UE operating in a licensed and/or unlicensed frequency band (e.g., a shared radio frequency band). In some aspects, the UE may receive the RP configuration in a licensed frequency band. In some aspects, the resources in the licensed frequency band (e.g., the SCI RP 316) reserved for SCI communication may increase the reliability of the communication of the SCI compared to SCI communication in an unlicensed frequency band. In some aspects, the resources in the licensed frequency band reserved for SCI may be referred to as a RP, an SCI RP 316, or other suitable terminology.

The UE may communicate with the BS and/or with other UEs in the form of radio frames. A radio frame may be divided into a plurality of subframes, for example, about 10. Each subframe can be divided into slots 238, for example, about 2. Each slot 238 may be further divided into sub-slots 310 and/or symbols. In some aspects, the SCI RP 316 may be used for communication of a first-stage SCI (SCI-1) 328 and/or a second-stage SCI (SCI-2) 326 in a slot 238 and/or a sub-slot 310.

In some aspects, a slot 238 may be partitioned such that each sub-slot 310 occupies multiple symbols within the slot 238. In some aspects, for example in sidelink mode 2, the UE may partition the slot 238 into sub-slots 310 based on how many symbols are required for a transmission. For example, a slot 238 may include 2, 3, 4, or more sub-slots 310. In some instances, a slot 238 may include 14 symbols. A sub-slot 310 may occupy 2, 3, 4, 5, 6, or more symbols. In some aspects, each sub-slot 310 may occupy contiguous symbols within the slot. In this regard, each sub-slot 310 may occupy groups of symbols that are contiguous in time. The group of contiguous symbols may include any number of symbols contained within the slot 238.

In some aspects, the UE may transmit the SCI-1 328 and/or the SCI-2 326 in resources of the SCI RP 316 to a second sidelink UE. The UE may transmit the SCI-1 328 and/or the SCI-2 326 in all of the reserved resources or a subset of the reserved resources in the SCI RP 316. For example, the SCARP 316 may include a set of slots 238 and/or sub-slots 310 in the time domain and a set of subchannels in the frequency domain. The UE may transmit the SCI-1 328 and/or the SCI-2 326 in a subset of the slots 238 and/or sub-slots 310 in the time domain and a subset of the set of subchannels in the frequency domain reserved for the UE. One or more other UEs may transmit an SCI-1 328 and/or the SCI-2 326 in a subset of slots 238 and/or sub-slots 310 and a subset of subchannels different from the subset of slots 238 and/or sub-slots 310 and subchannels reserved for the UE. In other words, each UE may have a subset of resources in the SCI RP 316 for transmitting its respective SCI-1 328 and/or the SCI-2 326. In some aspects, the SCI-1 328 and/or the SCI-2 326 may be communicated in a sub-slot 310 (e.g., 1, 2, 3, or more symbols) to reduce the amount of resources required to communicate the SCI-1 328 and/or the SCI-2 326 as compared to communicating the SCI-1 328 and/or the SCI-2 326 in a slot 238.

In some aspects, the SCI-1 328 and/or the SCI-2 326 transmitted by the UE may include a COT starting position 324 of COT resources 314 in an unlicensed frequency band. In this regard, the UE may transmit the SCI-1 328 and/or the SCI-2 326 via a physical sidelink control channel (PSCCH), a physical sidelink shared channel (PSSCH), or other suitable channel. The transmitting UE may perform an LBT procedure at the starting position 324 to gain the COT resources 314 and transmit a PSSCH based on a successful LBT procedure.

In some aspect, the SCI-1 328 and/or the SCI-2 326 may include one or more fields to indicate the COT starting position 324 of the COT resources 314 in the unlicensed frequency band. The COT resources 314 in the unlicensed frequency band may be allocated to a specific UE intended to receive the PSSCH. In some aspects, certain COT resources 314 (e.g., slots and/or sub-slots) may be allocated to different UEs. Certain COT resources 314 allocated to different UEs may overlap in the time domain and/or frequency domain to increase the throughput of the network and/or to decrease the latency associated with the PSSCH transmission. For example, the SCI-1 328 may include, without limitation, one or more fields to convey a frequency domain resource allocation (FDRA), a time domain resource allocation (TDRA), a resource reservation period (e.g., a period for repeating the SCI transmission and the corresponding COT resources 314), a modulation and coding scheme (MCS) for a second stage SCI-2 326, a beta offset value for the SCI-2 326, a DMRS port (e.g., one bit indicating a number of data layers), a physical sidelink feedback channel (PSFCH) indicator, a priority level associated with the UE and/or a transport block the UE intends to transmit in the COT resources 314, one or more additional reserved bits, or a combination thereof. The beta offset may indicate the coding rate for transmitting the SCI-2 326. The beta offset may indicate an offset to the MCS index. In some examples, the FDRA may be a number of bits in the SCI-1 328 that indicate a number of subchannels and/or a frequency interlace 312 reserved for the COT resources 314. The TDRA may be a number of bits in the SCI-1 328 (e.g., 5 bits, 9 bits, or some other number of bits) that may indicate a number of slots 238 and/or sub-slots 310 reserved for the COT resources 314.

In some aspects, the COT resources 314 may be frequency division multiplexed (e.g., frequency interlaced) with COT resources 314 associated with one or more other UEs. In this regard, a frequency interlace configuration may be indicated by the FDRA. The COT resources 314 may be frequency interlaced over a frequency band (e.g., a 20 MHz frequency band, a 40 MHz frequency band, an 80 MHz frequency band, a 160 MHz frequency band, a licensed frequency band, an unlicensed frequency band, etc.), For instance, a frequency-interlaced-based COT resource 314 pool may include a plurality of frequency interlaces 312 over a 20 MHz band or other suitable band, where each frequency interlace 312 may include a plurality of resource blocks (RBs) distributed over the frequency band. For example, the plurality of RBs of a frequency interlace 312 may be spaced apart from each other by one or more other RBs in the unlicensed frequency band. A sidelink UE may select the COT resources 314 in the form of frequency interlaces 312 from the COT resources 314 in the unlicensed frequency band. For example, the plurality of RBs of a frequency interlace 312 may be spaced apart from each other by one or more other RBs in the unlicensed frequency band. The RBs may be partitioned in one or more subchannels in the frequency domain. The UE may select a frequency interlace 312 that includes every second, third, fourth, or other increment of subchannels over the entire unlicensed frequency band. Another UE may select a different frequency interlace 312 of subchannels in the frequency band. For example, a first UE may select a frequency interlace that includes every second subchannel in a subset of the unlicensed frequency band (e.g., the lower half of the unlicensed frequency band) while a second UE may select a frequency interlace that includes every second subchannel in a different subset of the unlicensed frequency band (e.g., the upper half of the unlicensed frequency band). Referring to FIG. 3, the UE 115a may select frequency interlace 312(3) while the UE 115b may select frequency interlace 312(1). The frequency interlaces 312(0) and 312(2) may be assigned to other UEs or may be unassigned. The UE 115a may transmit a PSSCH in COT resources 334(a) after a successful LBT 329. The UE 115b may transmit a PSSCH in COT resources 334(b) after a successful LBT 329.

In some aspects, when the UE is frequency interlaced with other UEs in the COT resources 314 of the unlicensed frequency band, the COT resources 314 associated with the one or more other UEs may have the same COT starting position 324 in time. For example, UE 115a, and the UE 115b may select COT resources 314 with the same starting slot. The UE 115a may select frequency interlace 312(3) starting at slot (i). The UE 115b may select frequency interlace 312(1) starting at slot (i). In some aspects, a third and fourth UE 115 may select frequency interlace 312(0) and frequency interlace 312(2) respectively starting at slot (i). The UE 115a and the UE 115(b) may select a COT duration 330 in the time domain that includes slot (i), slot (i+1), slot (i+2), and slot (i+3), In some aspects, the UE may select a frequency interlace 312 from a set of frequency interlaces satisfying an RSRP threshold associated with the other UEs. The UE may be physically distanced from one or more other UEs such that transmissions from the one or more other UEs may not cause potential interference to the transmissions of the UE. In some aspects, the UE may determine a level of interference based on a reference signal received power (RSRP) associated with the other UE. For example, the UE may determine (e.g., estimate) an interference level associated with transmissions of the other UE in the unlicensed frequency band based on the RSRP level of the other UE's SCI transmissions in the licensed band (e.g., in the SCI RP 316). In other words, the RSRP level of the other UE's SCI transmissions in the licensed band may be a proxy for the interference level caused by the other UE in the unlicensed band. In some aspects, the UE may determine the interference level based on the RSRP satisfying a threshold. For example, the UE may monitor the RSRP levels of the DMRS in the SCI transmissions from other UEs in the licensed frequency band over a set of resource blocks in the SCI RP 316. The set of resource blocks may be a reservation sensing window (RSW). The RSW may include a set of contiguous slots 238 and/or sub-slots 310 and a set of subchannels in the SCI RP 316. The SCI transmission may indicate the frequency interlace 312 selected by the UE transmitting the SCI-1 328 and/or the SCI-2 326. The UE may select the frequency interlace 312 based on the RSRP of the SCI-1 328 and/or the SCI-2 326 transmitted by other UEs during the RSW. The UE may select the same frequency interlace 312 (e.g., the same interlaced sub channels) as another UE having the lowest RSRP (e.g., the lowest level of potential interference). In this way, the network may increase data throughput based on frequency diversity and/or spatial re-use. In some aspects, if a subset of resources in the SCI RP 316 are associated with multiple UEs satisfying the RSRP threshold, the UE may randomly select a frequency interlace 312 from among the subset of resources satisfying the threshold. If the subset of resources satisfying the RSRP threshold is below a threshold level (e.g., less than 10%, less than 20%, or other suitable threshold level), the UE may adjust the RSRP threshold (e.g., increase the RSRP threshold) during one or more subsequent RSWs. In this way, a balance between reducing interference levels and providing COT access to the UEs may be maintained.

Figure 4:
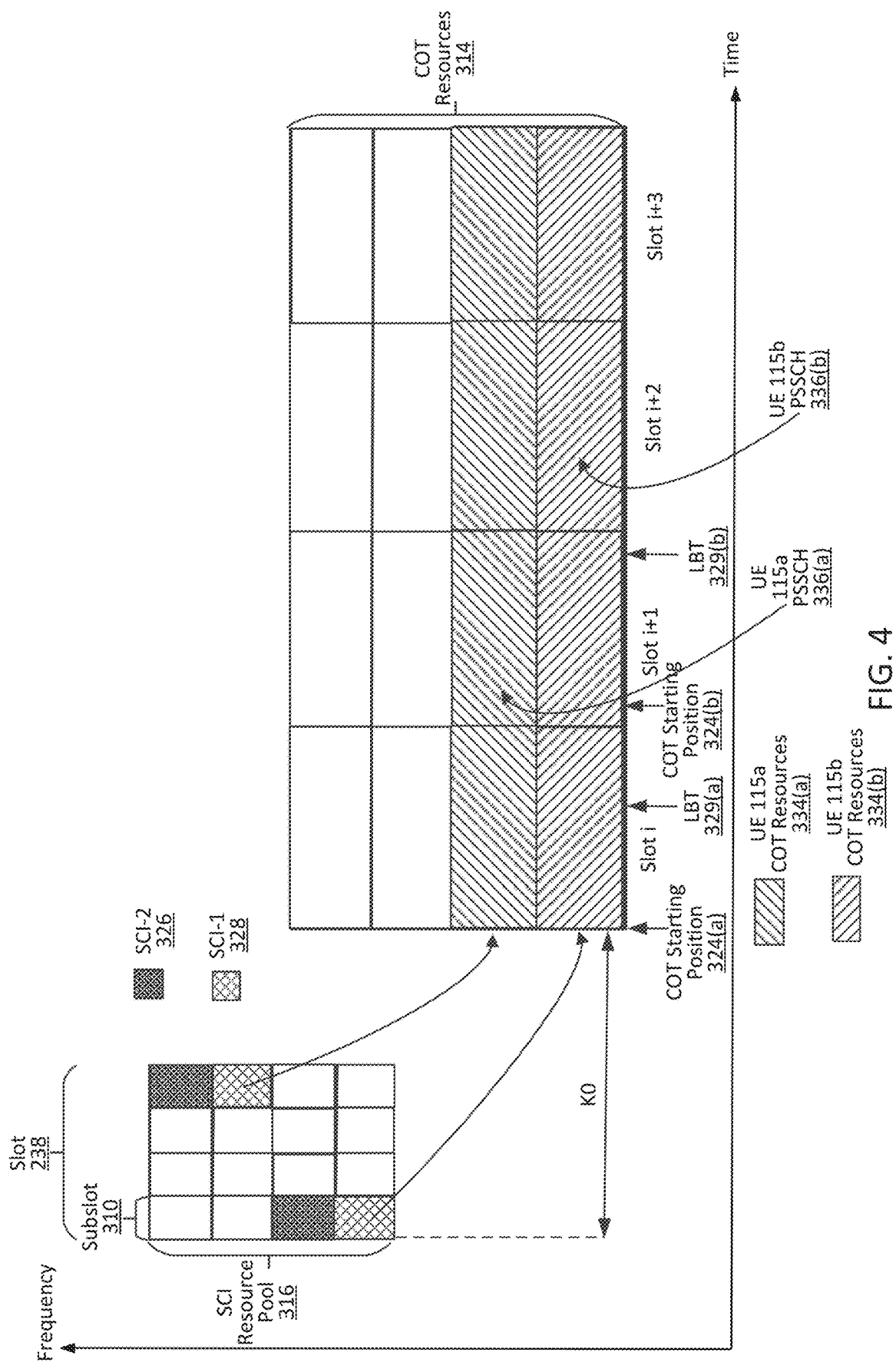
FIG. 4 illustrates time and frequency domain resources associated with a channel occupancy time (COT) according to some aspects of the present disclosure.

FIG. 4 illustrates time and frequency domain resources associated with a channel occupancy time (COT) according to some aspects of the present disclosure. In FIG. 4, the x-axis represents time in some arbitrary units and the y-axis represents frequency in some arbitrary units. In some aspects a UE (e.g., the UE 115 or the UE 600) may receive a resource pool (RP) configuration from a BS for an SCI RP 316 that indicates resources in a licensed frequency band reserved for SCI-1 328 and/or the SCI-2 326. In some aspects, the UE may receive the RP configuration in a licensed frequency band. In some aspects, the resources in the licensed frequency band (e.g., the SCI RP 316) reserved for SCI-1 328 and/or SCI-2 326 communication may increase the reliability of the communication of the SCI-1 328 and/or the SCI-2 326 compared to communication in an unlicensed frequency band.

In some aspects, the UE may monitor for the SCI transmissions from other UEs in one or more subsets of the reserved resources in the SCI RP 316. The UE may receive the SCI-1 328 and/or the SCI-2 326 from one or more of the other UEs based on monitoring the one or more subsets of the reserved resources in the SCI RP 316. The UE may decode the SCI-1 328 and/or the SCI-2 326 from the other UEs to determine the COT resources 314 the other UEs will attempt to use in the unlicensed frequency band. The UE may select resources in the COT resources 314 that the other UEs have not reserved and transmit the SCI-1 328 and/or the SCI-2 326 to another UE indicating COT resources 314 that are not reserved by the other UEs.

In some aspects, the starting position of the COT resources 314 may indicate a starting slot 238, a starting sub-slot 310, a starting symbol, and/or an offset from a starting slot 238, a starting sub-slot 310, or a starting symbol in the COT resources 314. In some aspects, the COT resources 314 in the unlicensed frequency band selected by the UE 115a may overlap in the time domain with COT resources 314 selected by the UE 115b. In some aspects, the COT resources assigned to multiple UEs may be multiplexed in the time domain (e.g., time division multiplexing (TDM)). In some instances, the UE may transmit the SCI-1 328 and/or the SCI-2 326 indicating a starting slot (i) and an ending slot (i+3) of the COT resources 314 in the unlicensed frequency band. Additionally or alternatively, the UE may transmit the SCI-1 328 and/or the SCI-2 326 indicating a starting slot (i) and a number of contiguous slots (e.g., 3) following the starting slot (i). In some aspects, the SCI may indicate the starting slot by an offset (e.g., K0) from the slot 238 or sub-slot 310 in which the SCI was transmitted. For example, the UE may transmit the SCI-1 328 and/or the SCI-2 326 to the second UE in slot 238. The SCI-1 328 and/or the SCI-2 326 may indicate the starting slot offset (e.g. K0) as j. The second UE may decode the SCI-1 328 and/or the SCI-2 326 and determine the starting slot to be slot (K0+j). In some aspects, the SCI-1 328 and/or the SCI-2 326 may indicate the ending slot by a number of contiguous slots from the starting slot. For example, the SCI-1 328 and/or the SCI-2 326 may indicate the ending slot ask slots (e.g., 3 slots) from the starting slot. The second UE may decode the SCI-1 328 and/or the SCI-2 326 and determine the ending slot to be slot (K0+j+k).

In some aspects, the UE may randomly select the COT starting position 324 from a subset of the COT resources 314. The UE may transmit SCI-1 328 and/or the SCI-2 326 that indicates a subset of the COT resources 314. The UE may randomly select the starting position 324 from the subset of the COT resources indicated in the SCI-1 328 and/or the SCI-2 326. The subset of COT resources 314 may be selected based on excluding COT resources 314 that were previously selected by other UEs. The UE may determine which MI resources 314 were previously selected by the other UEs by monitoring the SCI-1 328 and/or the SCI-2 326 transmissions of the other UEs. The UE 115($a$) may perform an LBT procedure 329($a$) to gain the COT and transmit a PSSCH 336($a$) based on a successful LBT procedure 329($a$). The UE 115($b$) may perform an LBT procedure 329($b$) to gain the COT and transmit a PSSCH 336($b$) based on a successful LBT procedure 329($b$). The COT starting position 324 may be a symbol within a slot 238. For example, the UE may select a symbol (e.g., a symbol having an index between 0 and 13) of the starting slot (e.g., slot (i)) as a starting position 324 of the COT resources 314. For example, the UE may randomly select from the set of symbols 0 to 13 as the COT starting position 324. Other UEs may also randomly select from the set of symbols 0 to 13 as the COT starting position 324. In this way, the UEs (e.g., UEs having an equal priority level) may have an equal probability of gaining the COT. In some aspects, the COT resources 314 may include a sequence of slots (e.g., slots (i), (i+1), (i+2), (i+3)). The UE may randomly choose a COT starting position 324 (e.g., a starting symbol) within one or more of the sequence of slots.

In some aspects, each COT starting position 324 (e.g., starting time) may be relative to a slot boundary and/or a sub-slot boundary. The COT starting position 324 may include start times before and/or after the slot boundary and/or the sub-slot boundary. For example, the set of COT starting positions 324 may include a set of start times prior to a slot boundary. In some aspects, each COT starting position 324 may be an offset from the slot boundary, sub-slot boundary, and/or other reference point by an integer multiple of a time period (e.g., 9 microseconds or other suitable amount of time). For example, the set of COT starting positions 324 may include start times at 0×9 microseconds (e.g., the slot boundary), 1×9 microseconds, 2×9 microseconds, etc. before (and/or after) the slot boundary, sub-slot boundary, and/or other reference point.

In some aspects, the SCI-1 328 and/or the SCI-2 326 may include a subset of available COT starting positions 324 of the COT resources 314. The subset of COT starting positions 324 of the COT resources 314 in the unlicensed frequency band may be based on a priority level associated with a transport block (TB) that the UE intends to transmit. The UE may prioritize the transmission of a TB based on controlling the COT starting position 324. In some aspects, the UE may determine the COT starting position 324 based on a packet delay budget associated with the TB that the UE intends to transmit. The UE may select a COT starting position 324 earlier than another UE based on the priority of the TB the UE intends to transmit having a higher priority than the TB the other UE intends to transmit. For example, the UE 115($a$) may have a TB to transmit with a higher priority than a TB the UE 115($b$) intends to transmit. The UE 115($a$) may select a COT starting position 324($a$) in slot (i) earlier than the COT starting position 324($b$) in slot (i+1) selected by the UE 115($b$). The earlier COT starting position 324($a$) in slot (i) may allow the UE 115($a$) to perform a successful LBT 329($a$) and transmit a TB via PSSCH 336($a$) in slot (i+1) earlier (e.g., higher priority) than the UE 115($b$) transmitting a TB via the PSSCH 336($b$) in slot (i+2) after performing a successful LBT 329($b$). In this manner, the COT resources 314 may be overprovisioned (e.g., overlapping COT resources 314 for different UEs) resulting in a higher throughput for the wireless network (e.g., the wireless network 100 or 200) as compared to provisioning the COT resources 314 without overlapping resources. If the UE 115($a$) having the higher priority TB for transmission fails to successfully perform LBT 329($a$), the UE 115($b$) having a lower priority TB to transmit may have an opportunity to transmit the TB based on a successful LBT 329($b$) in the overlapping COT resources 314. In some aspects, multiple COT starting positions 324 may be associated with different priority levels. For example, the UE may have 8 different COT starting positions 324 to select from and the priority level may be selected from a set of 4 TB priority levels. The earliest COT starting positions 324 (e.g., the earliest two starting positions) may be associated with the highest priority level (e.g., priority level 1). The next two COT starting positions 324 after the earliest two starting positions may be associated with the next highest priority level (e.g., priority level 2). The next two COT starting positions 324 may be associated with the next highest priority level (e.g., priority level 3). The last two COT starting positions 324 may be associated with the lowest priority level (e.g., priority level 4).

Figure 5:
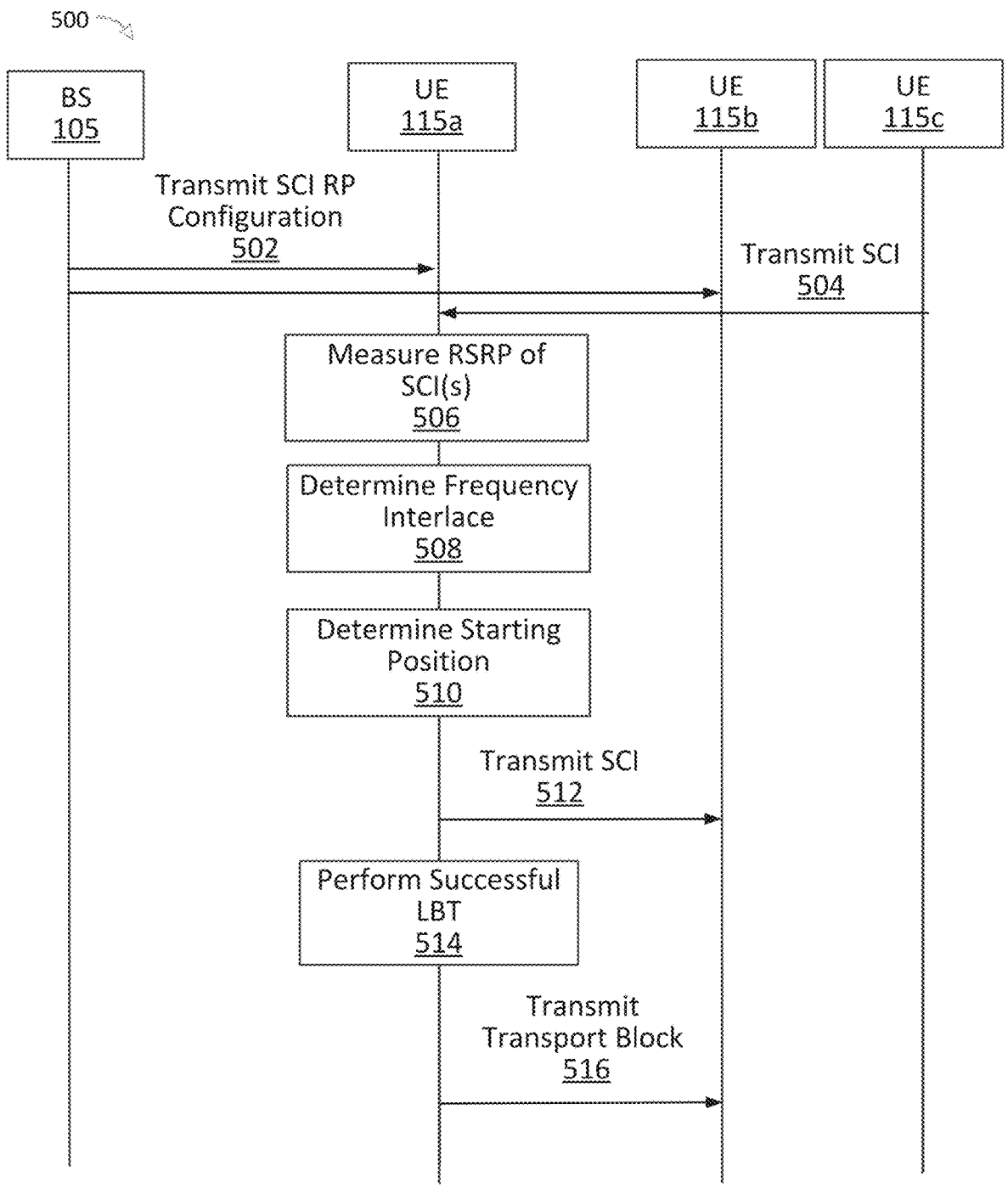
FIG. 5 is a signaling diagram of a communication method according to some aspects of the present disclosure.

FIG. 5 is a signaling diagram of a communication method 500 according to some aspects of the present disclosure. At action 502, the method 500 includes the BS 105 transmitting an SCI RP configuration to the UE 115$a$ and/or the UE 115$b$. In this regard, the BS 105 may transmit the SCI RP configuration in a physical downlink control channel (PDCCH), a physical broadcast channel (PBCH), a physical downlink shared channel (PDSCH), or other suitable channel. In some aspects, the BS 105 may transmit the SCI RP configuration in downlink control information (e.g., a DCI3_x or other DCI communication format).

At action 504, the UE 115$c$ may transmit an SCI to the UE 115$a$. In this regard, the UE 115$a$ may monitor for the SCI transmissions from other UEs such as the UE 115$c$ in one or more subsets of the reserved resources in the SCI RP. The UE 115$a$ may receive the SCI-1 and/or the SCI-2 from the UE 115$c$ based on monitoring the one or more subsets of the reserved resources in the SCI RP. The UE 115$a$ may decode the SCI-1 and/or the SCI-2 from the UE 115$c$ to determine the COT resources the UE 115$c$ will attempt to use in the unlicensed frequency band. In some aspects, the UE 115$a$ may select resources in the COT resources that the UE 115$c$ has not reserved.

At action 506, the UE 115$a$ may measure the RSRP of the SCI transmission form the UE 115$c$ at action 504. The UE 115$a$ may monitor the RSRP levels of the DMRS in the SCI transmissions from the UE 115c and other UEs in the licensed frequency band over a set of resource blocks. The set of resource blocks may be a reservation sensing window (RSW). The RSW may include a set of contiguous slots and/or sub-slots and a set of subchannels.

At action 508, the UE 115a may determine a frequency interlace in the COT resources for transmitting a TB. The COT resources may be frequency interlaced over a frequency band (e.g., a 20 MHz frequency band, a 40 MHz frequency band, an 80 MHz frequency band, a 160 MHz frequency band, a licensed frequency band, an unlicensed frequency band, etc.). For instance, a frequency-interlaced-based sidelink resource pool may include a plurality of frequency interlaces over a 20 MHz band or other suitable band, where each frequency interlace may include a plurality of resource blocks (RBs) distributed over the frequency band. For example, the plurality of RBs of a frequency interlace may be spaced apart from each other by one or more other RBs in the unlicensed frequency band.

At action 510, the UE 115a may determine a COT starting position. The COT starting position may indicate a starting slot, starting sub-slot, starting symbol, and/or offset from a starting slot, a starting sub-slot, or a starting symbol in the unlicensed frequency band. In some aspects, the COT resources in the unlicensed frequency band assigned to a first UE may overlap in the time domain with COT resources allocated to one or more other UEs. In some aspects, the COT resources assigned to multiple UEs may be multiplexed in the time domain (e.g., time division multiplexing (TDM)). In some aspects, the UE may randomly select the starting position of the COT resources from a subset of the COT resources. The subset of starting positions of the COT resources in the unlicensed frequency band may be based on a priority level associated with a transport block (TB) that the UE intends to transmit. The UE may prioritize the transmission of a TB based on controlling the starting position. In some aspects, the UE may determine the starting position based on a packet delay budget associated with the TB that the UE intends to transmit.

At action 512, the UE 115a may transmit the SCI to the UE 115b. The SCI may include an SCI-1 and/or an SCI-2. In this regard, the UE 115a may transmit the SCI to the UE 115b in resources configured by the SCI RP. The UE 115a may transmit the SCI via a PSCCH and/or a PSSCH.

At action 514, the UE 115a may perform a listen-before-talk (LBT) procedure in the unlicensed frequency band. The UE may perform one or more LBTs beginning at the COT starting time indicated in the SCI. The selected starting time may be based on a priority associated with the TB(s). In some aspects, the UE 115a may perform the LBT based on an LBT configuration received from the BS. The LBT configuration may include the type of LBT (e.g., a frame-based equipment (FBE)-based LBT and/or a load-based equipment (LBE)-based LBT), the category of LBT (e.g., CAT2-LBT and/or CAT4-LBT), and/or at least one direction (e.g., a beam direction) associated with the LBT At action 516, the UE 115a may transmit a transport block (TB) to the UE 115b. In this regard, the UE 115a may transmit the TB via a physical sidelink shared channel (PSSCH) communication in the COT resources of the unlicensed frequency band. The UE 115a may transmit one or more TBs via the PSSCH based on the LBT procedure at action 514 being successful. In some aspects, the UE 115a may transmit the TB(s) to the UE 115b in at least one beam direction that has successfully cleared the LBT. In some aspects, the UE 115a and the UE 115b may execute a HARQ process for potential retransmission of the one or more TBs in the unlicensed frequency band.

Figure 6:
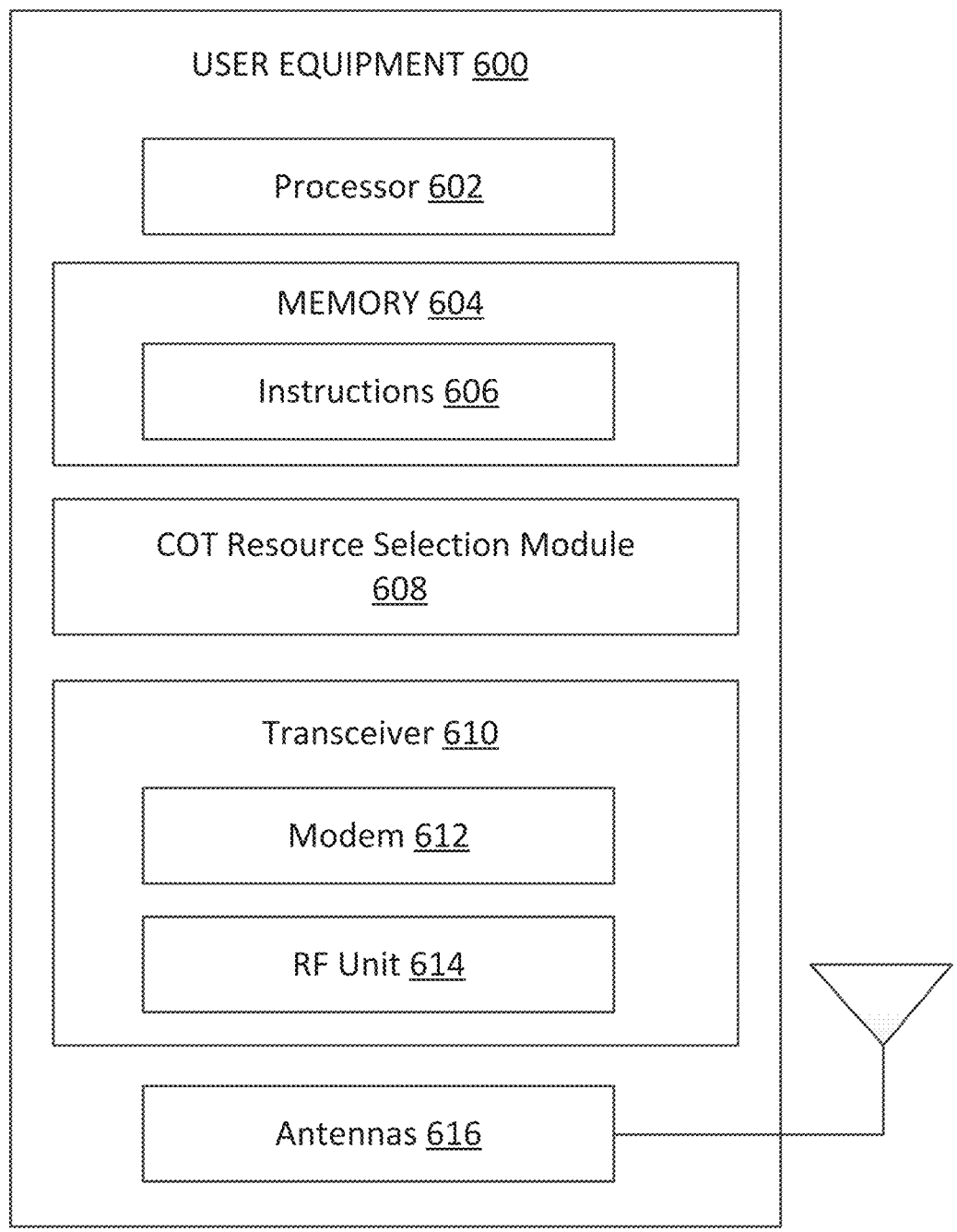
FIG. 6 is a block diagram of an exemplary user equipment (UE) according to some aspects of the present disclosure.

FIG. 6 is a block diagram of an exemplary UE 600 according to some aspects of the present disclosure. The UE 600 may be the UE 115 in the network 100 or 200 as discussed above. As shown, the UE 600 may include a processor 602, a memory 604, a COT resource selection module 608, a transceiver 610 including a modem subsystem 612 and a radio frequency (RF) unit 614, and one or more antennas 616. These elements may be coupled with each other and in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 604 includes a non-transitory computer-readable medium. The memory 604 may store instructions 606. The instructions 606 may include instructions that, when executed by the processor 602, cause the processor 602 to perform the operations described herein with reference to the UI s 115 in connection with aspects of the present disclosure, for example, aspects of FIGS. 2-5 and 8-9. Instructions 606 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The COT resource selection module 608 may be implemented via hardware, software, or combinations thereof. For example, the COT resource selection module 608 may be implemented as a processor, circuit, and/or instructions 606 stored in the memory 604 and executed by the processor 602.

In some aspects, the COT resource selection module 608 may be configured to receive, from a base station (BS), a resource pool (RP) configuration that indicates resources in a licensed frequency band reserved for sidelink control information (SCI). The COT resource selection module 608 may be further configured to transmit, to a second sidelink UE, the SCI in the reserved resources, wherein the SCI includes a starting position of channel occupancy time (COT) resources in an unlicensed frequency band. The COT resource selection module 608 may be further configured to transmit, to the second sidelink UE, a physical sidelink shared channel (PSSCH) via the COT resources in the unlicensed frequency band.

As shown, the transceiver 610 may include the modem subsystem 612 and the RF unit 614. The transceiver 610 can be configured to communicate bi-directionally with other devices, such as the BSs 105 and/or the UEs 115. The modem subsystem 612 may be configured to modulate and/or encode the data from the memory 604 and the COT resource selection module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together to enable the UE 600 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The antennas 616 may include multiple antennas of similar or different designs in order to sustain multiple transmission links. The RF unit 614 may configure the antennas 616.

In some instances, the UE 600 can include multiple transceivers 610 implementing different RATs (e.g., NR and LTE). In some instances, the UE 600 can include a single transceiver 610 implementing multiple RATs (e.g., NR and LTE). In some instances, the transceiver 610 can include various components, where different combinations of components can implement RATs.

In some aspects, the processor 602 may be coupled to the memory 604, the COT resource selection module 608, and/or the transceiver 610. The processor 602 and may execute operating system (OS) code stored in the memory 604 in order to control and/or coordinate operations of the COT resource selection module 608 and/or the transceiver 610. In some aspects, the processor 602 may be implemented as part of the COT resource selection module 608.

Figure 7:
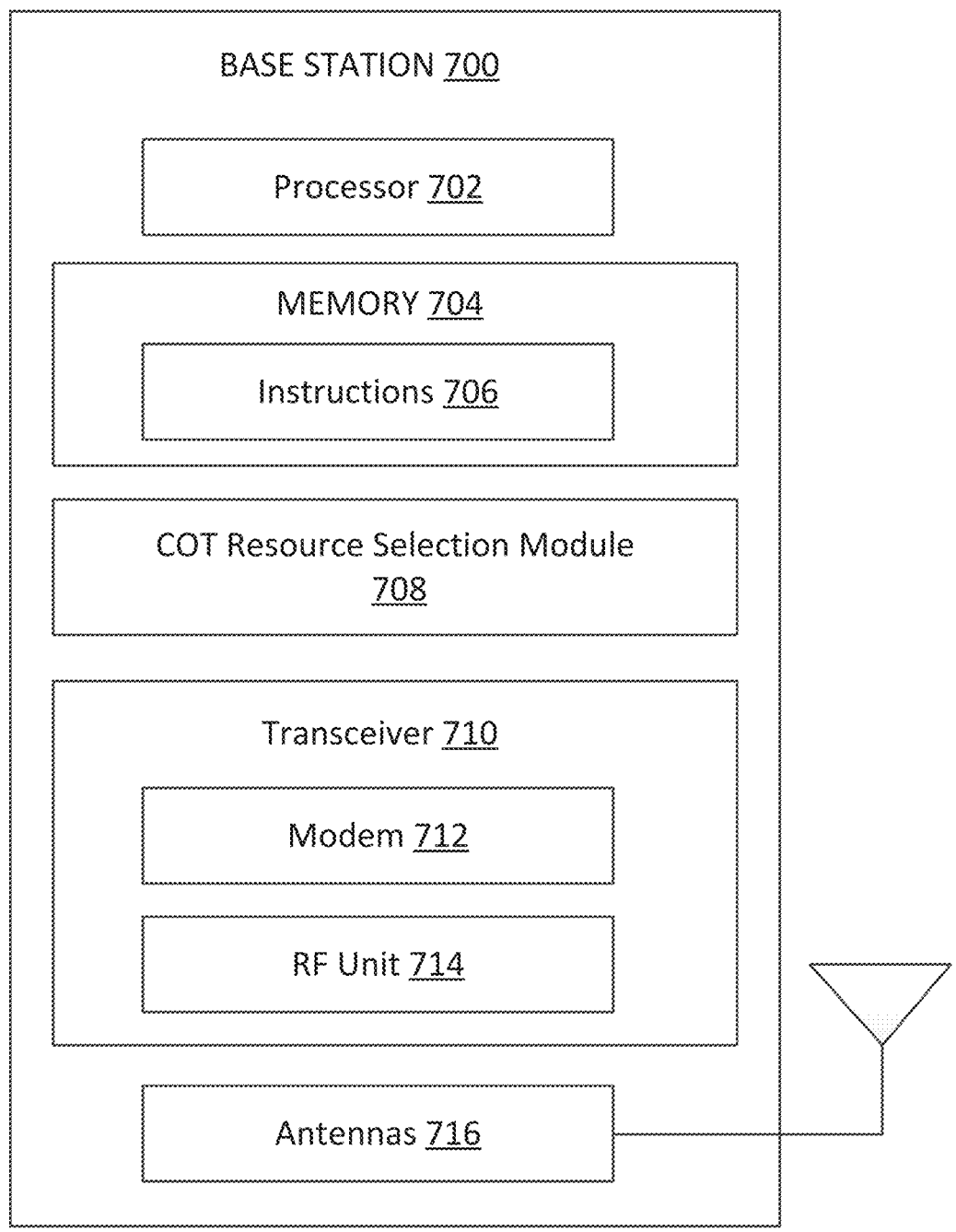
FIG. 7 is a block diagram of an exemplary base station (BS) according to some aspects of the present disclosure.

FIG. 7 is a block diagram of an exemplary BS 700 according to some aspects of the present disclosure. The BS 700 may be a BS 105 as discussed above. As shown, the BS 700 may include a processor 702, a memory 704, a COT resource selection module 708, a transceiver 710 including a modem subsystem 712 and a RF unit 714, and one or more antennas 716. These elements may be coupled with each other and in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 2-5 and 8-9. Instructions 706 may also be referred to as code, which may be interpreted broadly to include any type of computer-readable statement(s).

The COT resource selection module 708 may be implemented via hardware, software, or combinations thereof. For example, the COT resource selection module 708 may be implemented as a processor, circuit, and/or instructions 706 stored in the memory 704 and executed by the processor 702.

The COT resource selection module 708 may be used for various aspects of the present disclosure, for example, aspects of FIGS. 2-5 and 8-9. In some aspects, the COT resource selection module 708 may be configured to transmit a resource pool (RP) configuration to a UE that indicates resources in a licensed frequency band reserved for sidelink control information (SCI).

Additionally or alternatively, the COT resource selection module 708 can be implemented in any combination of hardware and software, and may, in some implementations, involve, for example, processor 702, memory 704, instructions 706, transceiver 710, and/or modem 712.

As shown, the transceiver 710 may include the modem subsystem 712 and the RF unit 714. The transceiver 710 can be configured to communicate bi-directionally with other devices, such as the UEs 115 and/or 600. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or UE 600. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 700 to enable the BS 700 to communicate with other devices.

The RE unit 714 may provide the modulated and/or processed data, e.g. data packets (or, more generally, data messages that may contain one or more data packets and other information), to the antennas 716 for transmission to one or more other devices. This may include, for example, a configuration indicating a plurality of sub-slots within a slot according to aspects of the present disclosure. The antennas 716 may further receive data messages transmitted from other devices and provide the received data messages for processing and/or demodulation at the transceiver 710. The antennas 716 may include multiple antennas of similar or different designs in order to sustain multiple transmission links.

In some instances, the BS 700 can include multiple transceivers 710 implementing different RATs (e.g., NR and LTE). In some instances, the BS 700 can include a single transceiver 710 implementing multiple RATs NR (e.g., NR and LTE). In some instances, the transceiver 710 can include various components, where different combinations of components can implement RATs.

In some aspects, the processor 702 may be coupled to the memory 704, the COT resource selection module 708, and/or the transceiver 710. The processor 702 may execute OS code stored in the memory 704 to control and/or coordinate operations of the COT resource selection module 708, and/or the transceiver 710. In some aspects, the processor 702 may be implemented as part of the COT resource selection module 708. In some aspects, the processor 702 is configured to transmit via the transceiver 710, to a UE, an indicator indicating a configuration of sub-slots within a slot.

Figure 8:
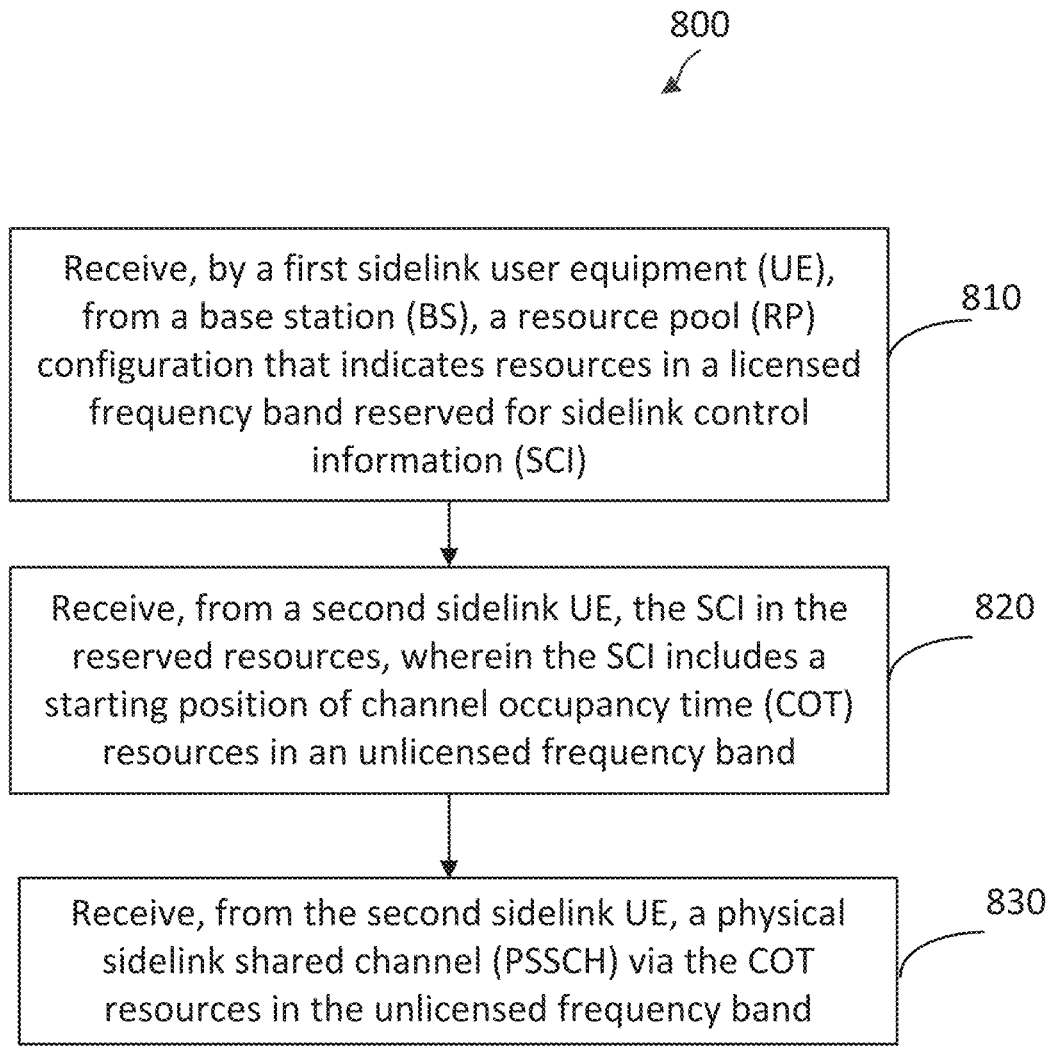
FIG. 8 is a flow diagram of a communication method according to some aspects of the present disclosure.

FIG. 8 is a flow diagram of a communication method 800 according to some aspects of the present disclosure. Aspects of the method 800 can be executed by a computing device (e.g., a processor, processing circuit, and/or other suitable component) of a wireless communication device or other suitable means for performing the actions. For example, a wireless communication device, such as the UE 115 or the UE 600, may utilize one or more components, such as the processor 602, the memory 604, the COT resource selection module 608, the transceiver 610, the modem 612, and the one or more antennas 616, to execute aspects of method 800. The method 800 may employ similar mechanisms as in the networks 100 and 200 and the aspects and actions described with respect to FIGS. 2-5. As illustrated, the method 800 includes a number of enumerated actions, but the method 800 may include additional actions before, after, and in between the enumerated actions. In some aspects, one or more of the enumerated actions may be omitted or performed in a different order.

At action 810, the method 800 includes a UE (e.g., the UE 115 or the UE 600) receiving a resource pool (RP) configuration from a base station (BS) that indicates resources in a licensed frequency band reserved for sidelink control information (SCI). In some aspects, the UE may operate in sidelink mode 1 in which the UE is in communication with the BS in order to receive the RP configuration from the BS. In this regard, the UE may receive the RP configuration in a physical downlink control channel (PDCCH), a physical broadcast channel (PBCH), a physical downlink shared channel (PDSCH), or other suitable channel. In some aspects, the UE may receive the RP configuration in downlink control information (e.g., a DCI3_x or other DCI communication format). The UE may be a sidelink UE operating in a licensed and/or unlicensed frequency band (e.g., a shared radio frequency band). In some aspects, the UE may receive the RP configuration in a licensed frequency band. In some aspects, the resources in the licensed frequency band (e.g., the SCI RP) reserved for SCI communication may increase the reliability of the communication of the SCI compared to SCI communication in an unlicensed frequency band. In some aspects, the resources in the licensed frequency band reserved for SCI may be referred to as a RP, an SCI RP, or other suitable terminology.

The UE may communicate with the BS and/or with other UEs in the form of radio frames. A radio frame may be divided into a plurality of subframes, for example, about 10. Each subframe can be divided into slots, for example, about 2. Each slot may be further divided into sub-slots and/or symbols. In some aspects, the resources reserved in the licensed frequency band for SCI may be used for communication of a first-stage SCI (SCI-1) and/or a second-stage SCI (SCI-2) in a slot and/or a sub-slot.

In some aspects, a slot may be partitioned such that each sub-slot occupies multiple symbols within the slot. In some aspects, for example in sidelink mode 2, the UE may partition the slot into sub-slots based on how many symbols are required for the transmission. For example, a slot may include 2, 3, 4, or more sub-slots. In some instances, a slot may include 14 symbols. A sub-slot may occupy 2, 3, 4, 5, 6, or more symbols. In some aspects, each sub-slot may occupy contiguous symbols within the slot. In this regard, each sub-slot may occupy groups of symbols that are contiguous in time. The group of contiguous symbols may include any number of symbols contained within the slot.

At action 820, the method 800 includes the UE transmitting the SCI in the reserved resources (e.g., the SCI RP) to a second sidelink UE. The UE may transmit the SCI in all of the reserved resources or a subset of the reserved resources. For example, the SCI RP may include a set of slots and/or sub-slots in the time domain and a set of subchannels in the frequency domain. The UE may transmit the SCI in a subset of the slots and/or sub-slots in the time domain and a subset of the set of subchannels in the frequency domain reserved for the UE. One or more other UEs may transmit an SCI in a subset of slots and/or sub-slots and a subset of subchannels different from the subset of slots and/or sub-slots and subchannels reserved for the UE. In other words, each UE may have a subset of resources in the SCI RP for transmitting its respective SCI. In some aspects, the SCI may be communicated in a sub-slot (e.g., 1, 2, 3, or more symbols) to reduce the amount of resources required to communicate the SCI as compared to communicating the SCI in a slot.

In some aspects, the SCI transmitted by the UE may include a starting position of channel occupancy time (COT) resources in an unlicensed frequency band. In this regard, the UE may transmit the SCI (e.g., the SCI-1 and/or the SCI-2) via a physical sidelink control channel (PSCCH), a physical sidelink shared channel (PSSCH), or other suitable channel. The transmitting UE may perform an LBT procedure at the starting position to gain the COT resources and transmit a PSSCH based on a successful LBT procedure.

The SCI (e.g., the SCI-1 and/or the SCI-2) may include one or more fields to indicate the starting position of the COT resources in the unlicensed frequency band. The COT resources in the unlicensed frequency band may be allocated to a specific UE intended to receive the PSSCH. In some aspects, certain COT resources (e.g., slots and/or sub-slots) may be allocated to different UEs. Certain COT resources allocated to different UEs may overlap in the time and/or frequency domain to increase the throughput of the network and/or to decrease the latency associated with the PSSCH transmission. For example, the SCI-1 may include, without limitation, one or more fields to convey a frequency domain resource allocation (FDRA), a time domain resource allocation (TDRA), a resource reservation period (e.g., a period for repeating the SCI transmission and the corresponding COT resources), a modulation and coding scheme (MCS) for a second stage SCI-2, a beta offset value for the SCI-2, a DMRS port (e.g., one bit indicating a number of data layers), a physical sidelink feedback channel (PSFCH) indicator, a priority level associated with the UE and/or a transport block the UE intends to transmit in the COT resources, one or more additional reserved bits, or a combination thereof. The beta offset may indicate the coding rate for transmitting the SCI-2. The beta offset may indicate an offset to the MCS index. In some examples, the FDRA may be a number of bits in the SCI-1 that indicate a number of subchannels and/or a frequency interlace reserved for the COT resources. The TDRA may be a number of bits in the SCI-1 (e.g., 5 bits, 9 bits, or some other number of bits) that may indicate a number of slots and/or sub-slots reserved for the COT resources.

In some aspects, the COT resources may be frequency division multiplexed (e.g., frequency interlaced) with COT resources associated with one or more other UEs. In this regard, a frequency interlace configuration may be indicated by the FDRA. The COT resources may be frequency interlaced over a frequency band (e.g., a 20 MHz frequency band, a 40 MHz frequency band, an 80 MHz frequency band, a 160 MHz frequency band, a licensed frequency band, an unlicensed frequency band, etc.). For instance, a frequency-interlaced-based sidelink resource pool may include a plurality of frequency interlaces over a 20 MHz band or other suitable band, where each frequency interlace may include a plurality of resource blocks (RBs) distributed over the frequency band. For example, the plurality of RBs of a frequency interlace may be spaced apart from each other by one or more other RBs in the unlicensed frequency band. A sidelink UE may select the COT resources in the form of frequency interlaces from the COT resources in the unlicensed frequency band.

For example, the plurality of RBs of a frequency interlace may be spaced apart from each other by one or more other RBs in the unlicensed frequency band. The RBs may be partitioned in one or more subchannels in the frequency domain. The UE may select a frequency interlace that includes every second, third, fourth, or other increment of subchannels over the entire unlicensed frequency band. Another UE may select a different interlace of subchannels in the frequency band. For example, a first UE may select a frequency interlace that includes every second subchannel in a subset of the unlicensed frequency band (e.g., the lower half of the unlicensed frequency band) while a second UE may select a frequency interlace that includes every second subchannel in a different subset of the unlicensed frequency band (e.g., the upper half of the unlicensed frequency band). In some aspects, when the UE is frequency interlaced with other UEs in the unlicensed frequency band, the COT resources associated with the one or more other UEs may have the same starting position in time. For example, a first UE, a second UE, and a third UE may be assigned COT resources with the same starting slot. The first UE may be assigned subchannels 0, 3, 6, 9, etc. starting at slot (i). The second UE may be assigned subchannels 1, 4, 7, 10, etc. starting at slot (i). The third UE may be assigned subchannels 2, 5, 8, 11, etc. starting at slot (i).

In some aspects, the UE may select a frequency interlace from a set of frequency interlaces satisfying an RSRP threshold associated with the other UEs. The UE may be physically distanced from one or more other UEs such that transmissions from the one or more other UEs may not cause potential interference to the transmissions(s) of the UE. In some aspects, the UE may determine a level of interference based on a reference signal received power (RSRP) associated with the other UE. For example, the UE may determine (e.g., estimate) an interference level associated with transmissions of the other UE in the unlicensed frequency band based on the RSRP level of the other UE's SCI transmissions in the licensed band. In other words, the RSRP level of the other UE's SCI transmissions in the licensed band may be a proxy for the interference level caused by the other UE in the unlicensed band. In some aspects, the UE may determine the interference level based on the RSRP satisfying a threshold. For example, the UE may monitor the RSRP levels of the DMRS in the SCI transmissions from other UEs in the licensed frequency band over a set of resource blocks. The set of resource blocks may be a reservation sensing window (RSW). The RSW may include a set of contiguous slots and/or sub-slots and a set of subchannels. The SCI transmission may indicate the frequency interlace selected by the UE transmitting the SCI. The UE may select the frequency interlace based on the RSRP of the SCIs transmitted by other UEs during the RSW. The UE may select the same frequency interlace (e.g., the same interlaced subchannels) as another UE having the lowest RSRP (e.g., the lowest level of potential interference). In this way, the network may increase data throughput based on frequency and/or spatial re-use. In some aspects, if a subset of reserved resources are associated with multiple UEs satisfying the RSRP threshold, the UE may randomly select a frequency interlace from among the subset of reserved resources satisfying the threshold. If the subset of reserved resources satisfying the RSRP threshold is below a threshold level (e.g., less than 10%, less than 20%, or other suitable threshold level), the UE may adjust the RSRP threshold (e.g., increase the RSRP threshold) during one or more subsequent RSWs. In this way, a balance between reducing interference levels and providing COT access to the UEs may be maintained.

In some aspects, the UE may receive a second SCI in a first subset of the reserved resources in the licensed frequency band (e.g., the SCI RP). The UE may monitor for the SCI transmissions from other UEs in one or more subsets of the reserved resources in the licensed frequency band (e.g., the SCI RP). The UE may receive the SCI from one or more of the other UEs based on monitoring the one or more subsets of the reserved resources in the licensed frequency band. The UE may decode the SCIs from the other UEs to determine the COT resources the other UEs will attempt to use in the unlicensed frequency band. The UE may select resources in the unlicensed frequency band that the other UEs have not reserved and transmit the SCI to the second UE indicating resources that are not reserved by the other UEs.

In some aspects, the starting position of the COT resources may indicate a starting slot, starting sub-slot, starting symbol, and/or offset from a starting slot, a starting sub-slot, or a starting symbol in the unlicensed frequency band. In some aspects, the COT resources in the unlicensed frequency band assigned to a first UE may overlap in the time domain with COT resources allocated to one or more other UEs. In some aspects, the COT resources assigned to multiple UEs may be multiplexed in the time domain (e.g., time division multiplexing (TDM)). In some instances, the UE may transmit an SCI indicating a starting slot and an ending slot of the COT in the unlicensed frequency band. Additionally or alternatively, the UE may transmit an SCI indicating a starting slot and a number of contiguous slots following the starting slot. In some aspects, the SCI may indicate the starting slot by an index number associated with the slot. In some aspects, the SCI may indicate the starting slot by an offset (e.g., K0) from the slot or sub-slot in which the SCI was transmitted. For example, the UE may transmit the SCI to the second UE in slot (i). The SCI may indicate the starting slot offset (e.g. K0) as j. The second UE may decode the SCI-1 328 and/or the SCI-2 326 and determine the starting slot to be slot (K0+j). In some aspects, the SCI-1 328 and/or the SCI-2 326 may indicate the ending slot by a number of contiguous slots from the starting slot. For example, the SCI-1 328 and/or the SCI-2 326 may indicate the ending slot as k slots (e.g., 3 slots) from the starting slot. The second UE may decode the SCI-1 328 and/or the SCI-2 326 and determine the ending slot to be slot (K0+j+k).

In some aspects, the UE may randomly select the starting position of the COT resources from a subset of the COT resources. The UE may transmit an SCI that indicates a subset of the COT resources. The UE may randomly select the starting position from the subset of the COT resources indicated in the SCI. The subset of COT resources may be selected based on excluding COT resources that were previously selected by other UEs. The UE may determine which COT resources were previously selected by the other UEs by monitoring the SCI transmissions of the other UEs. The UE may begin an LBT procedure to gain the COT and transmit a PSSCH based on a successful LBT procedure. The starting position may be a symbol within a slot. For example, the UE may select a symbol (e.g., a symbol having an index between 0 and 13) of the starting slot as a starting position of the COT resources. For example, the UE may randomly select from the set of symbols 0 to 13 as the starting position. Other UEs may also randomly select from the set of symbols 0 to 13 as the starting position. In this way, the UEs (e.g., UEs having an equal priority level) may have an equal probability of gaining the COT. In some aspects, the COT resources may include a sequence of slots. The UE may randomly choose a starting position (e.g., a starting symbol) within one or more of the sequence of slots.

In some aspects, each starting position (e.g., starting time) may be relative to a slot boundary and/or a sub-slot boundary. The starting position may include start times before and/or after the slot boundary and/or the sub-slot boundary. For example, the set of starting positions may include a set of start times prior to a slot boundary. In some aspects, each starting position may be an offset from the slot boundary, sub-slot boundary, and/or other reference point by an integer multiple of a time period (e.g., 9 microseconds or other suitable amount of time). For example, the set of starting positions may include start times at 0×9 microseconds (e.g., the slot boundary), 1×9 microseconds, 2×9 microseconds, etc. before and/or after) the slot boundary, sub-slot boundary, and/or other reference point.

In some aspects, the SCI may include a subset of available starting positions of the COT resources. The subset of starting positions of the COT resources in the unlicensed frequency band may be based on a priority level associated with a transport block (TB) that the UE intends to transmit. The UE may prioritize the transmission of a TB based on controlling the starting position. In some aspects, the UE may determine the starting position based on a packet delay budget associated with the TB that the UE intends to transmit. The UE may select a starting position earlier than another UE based on the priority of the TB the UE intends to transmit having a higher priority than the TB the other UE intends to transmit. In this manner, the COT resources may be overprovisioned (e.g., overlapping COT resources for different UEs) resulting in a higher throughput for the wireless network (e.g., the wireless network 100 or 200) as compared to provisioning the COT resources without overlapping resources. If the UE having the higher priority TB for transmission fails to successfully perform an LBT, the other UE, having a lower priority TB to transmit may have an opportunity to transmit the TB based on a successful LBT in the overlapping COT resources. In some aspects, multiple starting positions may be associated with different priority levels. For example, the UE may have 8 different starting positions to select from and the priority level may be selected from a set of 4 TB priority levels. The earliest starting positions (e.g., the earliest two starting positions) may be associated with the highest priority level (e.g., priority level 1). The next two starting positions after the earliest two starting positions may be associated with the next highest priority level (e.g., priority level 2). The next two starting positions may be associated with the next highest priority level (e.g., priority level 3). The last two starting positions may be associated with the lowest priority level (e.g., priority level 4).

At action 830, the UE may transmit a physical sidelink shared channel (PSSCH) communication via the COT resources in the unlicensed frequency band. In this regard, the UE may perform a listen-before-talk (LBT) procedure in the unlicensed frequency band. The UE may transmit, at action 830, one or more TBs via the PSSCH based on the LBT procedure being successful. The UE may perform one or more LBTs beginning at the starting time indicated in the SCI. The selected starting time may be based on a priority associated with the TB(s). The UE may transmit the TB(s) to the second UE via the PSSCH after the selected starting position based on the LBT procedure being successful. In some aspects, the UE may transmit the TB(s) to the second UE in at least one beam direction that has successfully cleared the LBT. In some aspects, the UE may transmit the one or more TBs based on an LBT configuration received from the BS. The LBT configuration may include the type of LBT (e.g., a frame-based equipment (FBE)-based LBT and/or a load-based equipment (LBE)-based LBT), the category of LBT (e.g., CAT2-LBT and/or CAT4-LBT), and/or at least one direction (e.g., a beam direction) associated with the LBT. In some aspects, the UE and the second UE may execute a HARQ process for potential retransmission of the one or more TBs in the unlicensed frequency band.

Figure 9:
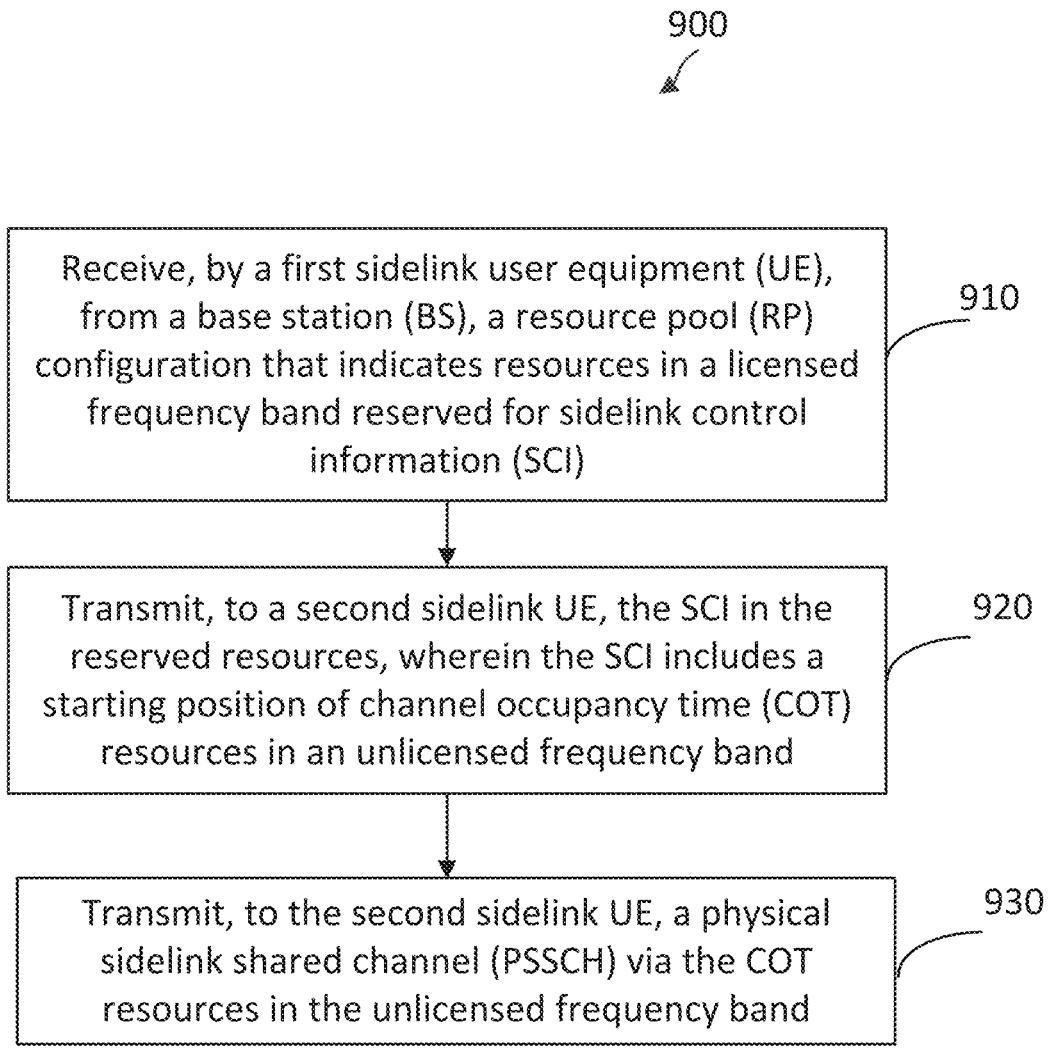
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the actions. For example, a wireless communication device, such as the UE 115 or the UE 600, may utilize one or more components, such as the processor 602, the memory 604, the COT resource selection module 608, the transceiver 610, the modem 612, and the one or more antennas 616, to execute aspects of method 900. The method 900 may employ similar mechanisms as in the networks 100 and 200 and the aspects and actions described with respect to FIGS. 2-5. As illustrated, the method 900 includes a number of enumerated actions, but the method 900 may include additional actions before, after, and in between the enumerated actions. In some aspects, one or more of the enumerated actions may be omitted or performed in a different order.

At action 910, the method 900 includes a UE (e.g., the UE 115 or the UE 600) receiving a resource pool (RP) configuration from a base station (BS) that indicates resources in a licensed frequency band reserved for sidelink control information (SCI). In some aspects, the UE may operate in sidelink mode 1 in which the UE is in communication with the BS in order to receive the RP configuration from the BS. In this regard, the UE may receive the RP configuration in a physical downlink control channel (PDCCH), a physical broadcast channel (PBCH), a physical downlink shared channel (PDSCH), or other suitable channel. In some aspects, the UE may receive the RP configuration in downlink control information (e.g., a DCI3_x or other DCI communication format). The UE may be a sidelink UE operating in a licensed and/or unlicensed frequency band (e.g., a shared radio frequency band). In some aspects, the UE may receive the RP configuration in a licensed frequency band. In some aspects, the resources in the licensed frequency band (e.g., the SCI RP) reserved for SCI communication may increase the reliability of the communication of the SCI compared to SCI communication in an unlicensed frequency band. In some aspects, the resources in the licensed frequency band reserved for SCI may be referred to as a RP, an SCI RP, or other suitable terminology.

The UE may communicate with the BS and/or with other UEs in the form of radio frames. A radio frame may be divided into a plurality of subframes, for example, about 10. Each subframe can be divided into slots, for example, about 2. Each slot may be further divided into sub-slots and/or symbols. In some aspects, the resources reserved in the licensed frequency band for SCI may be used for communication of a first-stage SCI (SCI-1) and/or a second-stage SCI (SCI-2) in a slot and/or a sub-slot.

In some aspects, a slot may be partitioned such that each sub-slot occupies multiple symbols within the slot. In some aspects, for example in sidelink mode 2, the UE may partition the slot into sub-slots based on how many symbols are required for the transmission. For example, a slot may include 2, 3, 4, or more sub-slots. In some instances, a slot may include 14 symbols. A sub-slot may occupy 2, 3, 4, 5, 6, or more symbols. In some aspects, each sub-slot may occupy contiguous symbols within the slot. In this regard, each sub-slot may occupy groups of symbols that are contiguous in time. The group of contiguous symbols may include any number of symbols contained within the slot.

At action 920, the method 900 includes the UE receiving the SCI in the reserved resources (e.g., the SCI RP) from a second sidelink UE. The UE may receive the SCI in all of the reserved resources or a subset of the reserved resources. For example, the SCI RP may include a set of slots and/or sub-slots in the time domain and a set of subchannels in the frequency domain. The UE may receive the SCI in a subset of the slots and/or sub-slots in the time domain and a subset of the set of subchannels in the frequency domain reserved for the UE. One or more other UEs may receive an SCI in a subset of slots and/or sub-slots and a subset of subchannels different from the subset of slots and/or sub-slots and subchannels reserved for the UE. In other words, each UE may have a subset of resources in the SCI RP for receiving its respective SCI. In some aspects, the SCI may be communicated in a sub-slot (e.g., 1, 2, 3, or more symbols) to reduce the amount of resources required to communicate the SCI as compared to communicating the SCI in a slot.

In some aspects, the SCI received by the CIE may include a starting position of channel occupancy time (COT) resources in an unlicensed frequency band. In this regard, the UE may receive the SCI (e.g., the SCI-1 and/or the SCI-2) via a physical sidelink control channel (PSCCH), a physical sidelink shared channel (PSSCH), or other suitable channel. A transmitting UE intending to transmit a TB via a PSSCH to a receiving UE may perform an LBT procedure at the starting position to gain the COT resources and transmit a PSSCH based on a successful LBT procedure.

The SCI (e.g., the SCI-1 and/or the SCI-2) may include one or more fields to indicate the starting position of the COT resources in the unlicensed frequency band. The COT resources in the unlicensed frequency band may be allocated to a specific UE intended to receive the PSSCH. In some aspects, certain COT resources (e.g., slots and/or sub-slots) may be allocated to different UEs. Certain COT resources allocated to different UEs may overlap in the time and/or frequency domain to increase the throughput of the network and/or to decrease the latency associated with the PSSCH transmission. For example, the SCI-1 may include, without limitation, one or more fields to convey a frequency domain resource allocation (FDRA), a time domain resource allocation (TDRA), a resource reservation period (e.g., a period for repeating the SCI transmission and the corresponding COT resources), a modulation and coding scheme (MCS) for a second stage SCI-2, a beta offset value for the SCI-2, a DMRS port (e.g., one bit indicating a number of data layers), a physical sidelink feedback channel (PSSCH) indicator, a priority level associated with the UE and/or a transport block the UE may receive in the COT resources, one or more additional reserved bits, or a combination thereof. The beta offset may indicate the coding rate for transmitting the SCI-2. The beta offset may indicate an offset to the MCS index. In some examples, the FDRA may be a number of bits in the SCI-1 that indicate a number of subchannels and/or a frequency interlace reserved for the COT resources. The TDRA may be a number of bits in the SCI-1 (e.g., 5 bits, 9 bits, or some other number of bits) that may indicate a number of slots and/or sub-slots reserved for the COT resources.

In some aspects, the COT resources may be frequency division multiplexed (e.g., frequency interlaced) with COT resources associated with one or more other UEs. In this regard, a frequency interlace configuration may be indicated by the FDRA. The COT resources may be frequency interlaced over a frequency band (e.g., a 20 MHz frequency band, a 410 MHz frequency band, an 80 MHz frequency band, a 160 MHz frequency band, a licensed frequency band, an unlicensed frequency band, etc.). For instance, a frequency-interlaced-based sidelink resource pool may include a plurality of frequency interlaces over a 20 MHz band or other suitable band, where each frequency interlace may include a plurality of resource blocks (RBs) distributed over the frequency band. For example, the plurality of RBs of a frequency interlace may be spaced apart from each other by one or more other RBs in the unlicensed frequency band. A sidelink UE may select the COT resources in the form of frequency interlaces from the COT resources in the unlicensed frequency band.

For example, the plurality of RBs of a frequency interlace may be spaced apart from each other by one or more other RBs in the unlicensed frequency band. The RBs may be partitioned in one or more subchannels in the frequency domain. The UE may be assigned a frequency interlace that includes every second, third, fourth, or other increment of subchannels over the entire unlicensed frequency band. Another UE may be assigned a different interlace of subchannels in the frequency band. For example, a first UE may be assigned a frequency interlace that includes every second subchannel in a subset of the unlicensed frequency band (e.g., the lower half of the unlicensed frequency band) while a second UE may be assigned a frequency interlace that includes every second subchannel in a different subset of the unlicensed frequency band (e.g., the upper half of the unlicensed frequency band). In some aspects, when the UE is frequency interlaced with other UEs in the unlicensed frequency band, the COT resources associated with the one or more other UEs may have the same starting position in time. For example, a first UE, a second UE, and a third UE may be assigned COT resources with the same starting slot. The first UE may be assigned subchannels 0, 3, 6, 9, etc. starting at slot (i). The second UE may be assigned subchannels 1, 4, 7, 10, etc. starting at slot (i). The third UE may be assigned subchannels 2, 5, 8, 11, etc. starting at slot (i).

In some aspects, the UE (e.g., the receiving UE) may be assigned a frequency interlace from a set of frequency interlaces satisfying an RSRP threshold associated with the other UEs. The UE may be physically distanced from one or more other UEs such that transmissions from the one or more other UEs may not cause potential interference to the transmissions(s) of the UE. In some aspects, a transmitting UE may determine a level of interference based on a reference signal received power (RSRP) associated with the other UE(s). For example, the transmitting UE may determine (e.g., estimate) an interference level associated with transmissions of the other UE(s) in the unlicensed frequency band based on the RSRP level of the other UE's SCI transmissions in the licensed band. In other words, the RSRP level of the other UE's SCI transmissions in the licensed band may be a proxy for the interference level caused by the other UE in the unlicensed band. In some aspects, the transmitting UE may determine the interference level based on the RSRP satisfying a threshold. For example, the transmitting UE may monitor the RSRP levels of the IMPS in the SCI transmissions from other UEs in the licensed frequency band over a set of resource blocks. The set of resource blocks may be a reservation sensing window (RSW). The RSW may include a set of contiguous slots and/or sub-slots and a set of subchannels. The SCI transmission may indicate the frequency interlace selected by the UE transmitting the SCI. The transmitting UE may select the frequency interlace based on the RSRP of the SCIs transmitted by other UEs during the RSW. The transmitting UE may select the same frequency interlace (e.g., the same interlaced subchannels) as another UE having the lowest RSRP (e.g., the lowest level of potential interference). In this way, the network may increase data throughput based on frequency and/or spatial re-use. In some aspects, if a subset of reserved resources are associated with multiple UEs satisfying the RSRP threshold, the transmitting UE may randomly select a frequency interlace from among the subset of reserved resources satisfying the threshold. If the subset of reserved resources satisfying the RSRP threshold is below a threshold level (e.g., less than 10%, less than 20%, or other suitable threshold level), the transmitting UE may adjust the RSRP threshold (e.g., increase the RSRP threshold) during one or more subsequent RSWs. In this way, a balance between reducing interference levels and providing COT access to the UEs may be maintained.

In some aspects, the starting position of the COT resources may indicate a starting slot, starting sub-slot, starting symbol, and/or offset from a starting slot, a starting sub-slot, or a starting symbol in the unlicensed frequency band. In some aspects, the COT resources in the unlicensed frequency band assigned to a first UE may overlap in the time domain with COT resources allocated to one or more other UEs. In some aspects, the COT resources assigned to multiple UEs may be multiplexed in the time domain (e.g., time division multiplexing (TDM)). In some instances, the UE may receive an SCI indicating a starting slot and an ending slot of the COT in the unlicensed frequency band. Additionally or alternatively, the UE may receive an SCI indicating a starting slot and a number of contiguous slots following the starting slot. In some aspects, the SCI may indicate the starting slot by an index number associated with the slot. In some aspects, the SCI may indicate the starting slot by an offset (e.g., K0) from the slot or sub-slot in which the SCI was received. For example, the UE may receive the SCI in slot (i). The SCI may indicate the starting slot offset (e.g. K0) as j. The second UE may decode the SCI-1 328 and/or the SCI-2 326 and determine the starting slot to be slot (K0+j). In some aspects, the SCI-1 328 and/or the SCI-2 326 may indicate the ending slot by a number of contiguous slots from the starting slot. For example, the SCI-1 328 and/or the SCI-2 326 may indicate the ending slot as k slots (e.g., 3 slots) from the starting slot. The second UE may decode the SCI-1 328 and/or the SCI-2 326 and determine the ending slot to be slot (K0+j+k). In some aspects, the transmitting UE may randomly select the starting position of the COT resources from a subset of the COT resources. The receiving UE may receive an SCI that indicates a subset of the COT resources. The transmitting UE may randomly select the starting position from the subset of the COT resources indicated in the SCI. The subset of COT resources may be selected based on excluding COT resources that were previously selected by other UEs. The transmitting UE may determine which COT resources were previously selected by the other UEs by monitoring the SCI transmissions of the other UEs. The transmitting UE may begin an LBT procedure to gain the COT and transmit a PSSCH based on a successful LBT procedure to the receiving UE. The starting position may be a symbol within a slot. For example, the transmitting UE may select a symbol (e.g., a symbol having an index between 0 and 13) of the starting slot as a starting position of the COT resources. For example, the transmitting UE may randomly select from the set of symbols 0 to 13 as the starting position. Other UEs may also randomly select from the set of symbols 0 to 13 as the starting position. In this way, the transmitting UEs (e.g., UEs having an equal priority level) may have an equal probability of gaining the COT. In some aspects, the COT resources may include a sequence of slots. The transmitting UE may randomly choose a starting position (e.g., a starting symbol) within one or more of the sequence of slots.

In some aspects, each starting position (e.g., starting time) may be relative to a slot boundary and/or a sub-slot boundary. The starting position may include start times before and/or after the slot boundary and/or the sub-slot boundary. For example, the set of starting positions may include a set of start times prior to a slot boundary. In some aspects, each starting position may be an offset from the slot boundary, sub-slot boundary, and/or other reference point by an integer multiple of a time period (e.g., 9 microseconds or other suitable amount of time). For example, the set of starting positions may include start times at 0×9 microseconds (e.g., the slot boundary), 1×9 microseconds, 2×9 microseconds, etc. before (and/or after) the slot boundary, sub-slot boundary, and/or other reference point.

In some aspects, the SCI may include a subset of available starting positions of the COT resources. The subset of starting positions of the COT resources in the unlicensed frequency band may be based on a priority level associated with a transport block (TB) that the transmitting UE intends to transmit to the receiving UE. The transmitting UE may prioritize the transmission of a TB based on controlling the starting position. In some aspects, the transmitting UE may determine the starting position based on a packet delay budget associated with the TB that the transmitting UE intends to transmit. The transmitting UE may select a starting position earlier than another UE based on the priority of the TB the transmitting UE intends to transmit having a higher priority than the TB the other UE intends to transmit. In this manner, the COT resources may be over-provisioned (e.g., overlapping COT resources for different UEs) resulting in a higher throughput for the wireless network (e.g., the wireless network 100 or 200) as compared to provisioning the COT resources without overlapping resources. If the transmitting UE having the higher priority TB for transmission fails to successfully perform an LBT, the other UE having a lower priority TB to transmit may have an opportunity to transmit the TB based on a successful LBT in the overlapping COT resources. In some aspects, multiple starting positions may be associated with different priority levels. For example, the transmitting UE may have 8 different starting positions to select from and the priority level may be selected from a set of 4 TB priority levels. The earliest starting positions (e.g., the earliest two starting positions) may be associated with the highest priority level (e.g., priority level 1). The next two starting positions after the earliest two starting positions may be associated with the next highest priority level (e.g., priority level 2). The next two starting positions may be associated with the next highest priority level (e.g., priority level 3). The last two starting positions may be associated with the lowest priority level (e.g., priority level 4).

At action 930, the UE may receive a physical sidelink shared channel (PSSCH) communication via the COT resources in the unlicensed frequency band. The UE may receive, at action 830, one or more TBs via the PSSCH based on an LBT procedure of the transmitting UE being successful. The transmitting UE may perform one or more LBTs beginning at the starting time indicated in the SCI. The selected starting time may be based on a priority associated with the TB(s). The UE may receive the TB(s) from the second UE (e.g., the transmitting UE) via the PSSCH after the selected starting position based on the LBT procedure being successful. In some aspects, the UE may receive the TB(s) from the second UE in at least one beam direction that has successfully cleared the LBT. In some aspects, the transmitting UE may transmit the one or more TBs based on an LBT configuration received from the BS. The LBT configuration may include the type of LBT (e.g., a frame-based equipment (FBE)-based LBT and/or a load-based equipment (LBE)-based LBT), the category of LBT (e.g., CAT2-LBT and/or CAT4-LBT), and/or at least one direction (e.g., a beam direction) associated with the LBT. In some aspects, the UE and the second UE may execute a HARQ process for potential retransmission of the one or more TBs in the unlicensed frequency band.

Further aspects of the present disclosure include the following:

Aspect 1 includes a method of wireless communication performed by a first sidelink user equipment (UE), the method comprising receiving, from a base station (BS), a resource pool (RP) configuration that indicates resources in a licensed frequency band reserved for sidelink control information (SCI); transmitting, to a second sidelink UE, the SCI in the reserved resources, wherein the SCI includes a starting position of channel occupancy time (COT) resources in an unlicensed frequency band; and transmitting, to the second sidelink UE, a physical sidelink shared channel (PSSCH) via the COT resources in the unlicensed frequency band.

Aspect 2 includes the method of aspect 1, further comprising performing a listen-before-talk (LBT) procedure in the unlicensed frequency band, wherein the transmitting the PSSCH via the COT resources comprises transmitting the PSSCH based on the LBT procedure being successful.

Aspect 3 includes the method of any of aspects 1-2, wherein the COT resources are frequency interlaced with COT resources associated with one or more other UEs.

Aspect 4 includes the method of any of aspects 1-3, wherein the COT resources and the COT resources associated with the one or more other UEs have a same starting position.

Aspect 5 includes the method of any of aspects 1-4, further comprising selecting a frequency interlace from a set of frequency interlaces satisfying an RSRP threshold associated with the one or more other UEs.

Aspect 6 includes the method of any of aspects 1-5, wherein the starting position of the COT resources indicates a starting slot in the unlicensed frequency band; the SCI further indicates an ending position of the COT resources in the unlicensed frequency band; and the ending position of the COT resources indicates an ending slot in the unlicensed frequency band.

Aspect 7 includes the method of any of aspects 1-6, further comprising receiving a second SCI in a first subset of the reserved resources, wherein the transmitting the SCI in the reserved resources comprises transmitting the SCI in a second subset of the reserved resources, wherein the second subset is different from the first subset.

Aspect 8 includes the method of any of aspects 1-7, further comprising randomly selecting the starting position of the COT resources from a subset of the COT resources.

Aspect 9 includes the method of any of aspects 1-8, further comprising receiving a second SCI indicating the starting position of the COT resources in the unlicensed frequency band; and measuring a reference signal received power (RSRP) associated with the second SCI, wherein the transmitting the PSSCH comprises transmitting the PSSCH in the starting position of the COT resources indicated in the second SCI based on at least one of the RSRP satisfying a threshold; or an amount of resources reserved in the unlicensed frequency band.

Aspect 10 includes the method of any of aspects 1-9, the SCI further includes a subset of starting positions of the COT resources; and the subset of starting positions of the COT resources in the unlicensed frequency band is based on a priority level associated with a transport block (TB) carried by the PSSCH.

Aspect 11 includes a method of wireless communication performed by a first sidelink user equipment (UE), the method comprising receiving, from a base station (BS), a resource pool (RP) configuration that indicates resources in a licensed frequency band reserved for sidelink control information (SCI); receiving, from a second sidelink UE, the SCI in the reserved resources, wherein the SCI includes a starting position of channel occupancy time (COT) resources in an unlicensed frequency band; and receiving, from the second sidelink UE, a physical sidelink shared channel (PSSCH) via the COT resources in the unlicensed frequency band.

Aspect 12 includes the method of aspect 11, wherein the COT resources are frequency interlaced with COT resources associated with one or more other UEs.

Aspect 13 includes the method of any of aspects 11 or 12, wherein the COT resources and the COT resources associated with the one or more other UEs have a same starting position.

Aspect 14 includes method of any of aspects 11-13, wherein the starting position of the COT resources indicates a starting slot in the unlicensed frequency band; the SCI further indicates an ending position of the COT resources in the unlicensed frequency band; and the ending position of the COT resources indicates an ending slot in the unlicensed frequency band.

Aspect 15 includes the method of any of aspects 11-14, wherein the SCI further includes a subset of starting positions of the COT resources; and the subset of starting positions of the COT resources in the unlicensed frequency band is based on a priority level associated with a transport block (TB) carried by the PSSCH.

Aspect 16 includes a non-transitory computer-readable medium storing one or more instructions for wireless communication, the one or more instructions comprising one or more instructions that, when executed by one or more processors of a first sidelink user equipment, cause the one or more processors to perform any one of aspects 1-10.

Aspect 17 includes a non-transitory computer-readable medium storing one or more instructions for wireless communication, the one or more instructions comprising one or more instructions that, when executed by one or more processors of a base station (BS), cause the one or more processors to perform any one of aspects 11-15.

Aspect 18 includes a first sidelink user equipment (UE) comprising one or more means to perform any one or more of aspects 1-10.

Aspect 19 includes a first sidelink user equipment (UE) comprising one or more means to perform any one or more of aspects 11-15.

Aspect 20 includes a first sidelink user equipment (UE) comprising a memory, a transceiver and at least one processor coupled to the memory and the transceiver, wherein the first sidelink UE is configured to perform any one or more of aspects 1-10.

Aspect 21 includes a first sidelink user equipment (UE) comprising a memory, a transceiver and at least one processor coupled to the memory and the transceiver, wherein the first sidelink UE is configured to perform any one or more of aspects 11-15.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first sidelink user equipment (UE), the method comprising:
   receiving, from a base station (BS), a resource pool (RP) configuration that indicates resources in a licensed frequency band reserved for sidelink control information (SCI);
   receiving a second SCI indicating a starting position of channel occupancy time (COT) resources in an unlicensed frequency band;
   transmitting, to a second sidelink UE, the SCI in the reserved resources, wherein the SCI includes the starting position of the COT resources in the unlicensed frequency band; and
   transmitting, to the second sidelink UE, a physical sidelink shared channel (PSSCH) via the COT resources in the unlicensed frequency band,
   wherein the transmitting the PSSCH comprises transmitting the PSSCH in the starting position of the COT resources indicated in the second SCI based on at least one of:
   a reference signal received power (RSRP) satisfying a threshold; or
   an amount of resources reserved in the unlicensed frequency band.

2. The method of claim 1, further comprising:
   performing a listen-before-talk (LBT) procedure in the unlicensed frequency band, wherein the transmitting the PSSCH via the COT resources comprises transmitting the PSSCH based on the LBT procedure being successful.

3. The method of claim 1, wherein the COT resources are frequency interlaced with COT resources associated with one or more other UEs.

4. The method of claim 3, wherein the COT resources and the COT resources associated with the one or more other UEs have a same starting position.

5. The method of claim 3, further comprising:
   selecting a frequency interlace from a set of frequency interlaces satisfying an RSRP threshold associated with the one or more other UEs.

6. The method of claim 1, wherein:
   the starting position of the COT resources indicates a starting slot in the unlicensed frequency band;
   the SCI further indicates an ending position of the COT resources in the unlicensed frequency band; and
   the ending position of the COT resources indicates an ending slot in the unlicensed frequency band.

7. The method of claim 1, further comprising:
   receiving the second SCI in a first subset of the reserved resources, wherein:

the transmitting the SCI in the reserved resources comprises transmitting the SCI in a second subset of the reserved resources, wherein the second subset is different from the first subset.

8. The method of claim 1, further comprising:
randomly selecting the starting position of the COT resources from a subset of the COT resources.

9. The method of claim 1, further comprising:
measuring the RSRP associated with the second SCI.

10. The method of claim 1, wherein:
the SCI further includes a subset of starting positions of the COT resources; and
the subset of starting positions of the COT resources in the unlicensed frequency band is based on a priority level associated with a transport block (TB) carried by the PSSCH.

11. A method of wireless communication performed by a first sidelink user equipment (UE), the method comprising:
receiving, from a base station (BS), a resource pool (RP) configuration that indicates resources in a licensed frequency band reserved for sidelink control information (SCI);
receiving, from a second sidelink UE, the SCI in the reserved resources, wherein the SCI includes a subset of starting positions of channel occupancy time (COT) resources in an unlicensed frequency band based on a priority level associated with a transport block (TB) carried by the PSSCH; and
receiving, from the second sidelink UE, a physical sidelink shared channel (PSSCH) via the COT resources in the unlicensed frequency band.

12. The method of claim 11, wherein the COT resources are frequency interlaced with COT resources associated with one or more other UEs.

13. The method of claim 12, wherein the COT resources and the COT resources associated with the one or more other UEs have a same starting position.

14. The method of claim 11, wherein:
the starting position of the COT resources indicates a starting slot in the unlicensed frequency band;
the SCI further indicates an ending position of the COT resources in the unlicensed frequency band; and
the ending position of the COT resources indicates an ending slot in the unlicensed frequency band.

15. A first sidelink user equipment (UE) comprising:
a memory;
a transceiver; and
at least one processor coupled to the memory and the transceiver, wherein the first sidelink UE is configured to:
receive, from a base station (BS), a resource pool (RP) configuration that indicates resources in a licensed frequency band reserved for sidelink control information (SCI);
receive a second SCI indicating a starting position of channel occupancy time (COT) resources in an unlicensed frequency band;
transmit, to a second sidelink UE, the SCI in the reserved resources, wherein the SCI includes the starting position of the COT resources in the unlicensed frequency band; and
transmit, to the second sidelink UE, a physical sidelink shared channel (PSSCH) via the COT resources in the unlicensed frequency band, wherein the transmitting the PSSCH comprises transmitting the PSSCH in the starting position of the COT resources indicated in the second SCI based on at least one of:
a reference signal received power (RSRP) satisfying a threshold; or
an amount of resources reserved in the unlicensed frequency band.

16. The first sidelink UE of claim 15, wherein the first sidelink UE is further configured to:
perform a listen-before-talk (LBT) procedure in the unlicensed frequency band; and
transmit the PSSCH based on the LBT procedure being successful.

17. The first sidelink UE of claim 15, wherein the COT resources are frequency interlaced with COT resources associated with one or more other UEs.

18. The first sidelink UE of claim 17, wherein the COT resources and the COT resources associated with the one or more other UEs have a same starting position.

19. The first sidelink UE of claim 17, wherein the first sidelink UE is further configured to:
select a frequency interlace from a set of frequency interlaces satisfying an RSRP threshold associated with the one or more other UEs.

20. The first sidelink UE of claim 15, wherein:
the starting position of the COT resources indicates a starting slot in the unlicensed frequency band;
the SCI further indicates an ending position of the COT resources in the unlicensed frequency band; and
the ending position of the COT resources indicates an ending slot in the unlicensed frequency band.

21. The first sidelink UE of claim 15, wherein the first sidelink UE is further configured to:
receive the second SCI in a first subset of the reserved resources; and
transmit the SCI in a second subset of the reserved resources, wherein the second subset is different from the first subset.

22. The first sidelink UE of claim 15, wherein the first sidelink UE is further configured to:
randomly select the starting position of the COT resources from a subset of the COT resources.

23. The first sidelink UE of claim 15, wherein the first sidelink UE is further configured to:
measure the RSRP associated with the second SCI.

24. The first sidelink UE of claim 15, wherein:
the SCI further includes a subset of starting positions of the COT resources; and
the subset of starting positions of the COT resources in the unlicensed frequency band is based on a priority level associated with a transport block (TB) carried by the PSSCH.

25. A first sidelink user equipment (UE) comprising:
a memory;
a transceiver; and
at least one processor coupled to the memory and the transceiver, wherein the first sidelink UE is configured to:
receive, from a base station (BS), a resource pool (RP) configuration that indicates resources in a licensed frequency band reserved for sidelink control information (SCI);
receive, from a second sidelink UE, the SCI in the reserved resources, wherein the SCI includes a subset of starting positions of channel occupancy time (COT) resources in an unlicensed frequency band based on a priority level associated with a transport block (TB) carried by the PSSCH; and receive, from the second sidelink UE, a physical sidelink shared channel (PSSCH) via the COT resources in the unlicensed frequency band.

26. The first sidelink UE of claim 25, wherein the COT resources are frequency interlaced with COT resources associated with one or more other UEs.

27. The first sidelink UE of claim 26, wherein the COT resources and the COT resources associated with the one or more other UEs have a same starting position.

28. The first sidelink UE of claim 25, wherein:

the starting position of the COT resources indicates a starting slot in the unlicensed frequency band;

the SCI further indicates an ending position of the COT resources in the unlicensed frequency band; and the ending position of the COT resources indicates an ending slot in the unlicensed frequency band.

* * * * *